US012681753B2

(12) United States Patent
Takamizawa et al.

(10) Patent No.: US 12,681,753 B2
(45) Date of Patent: Jul. 14, 2026

(54) INFORMATION PROCESSING SYSTEM MANAGING MEMBERSHIP OF GROUP OF PLURALITY OF TERMINALS BASED ON DETECTING LINKAGE MARK AND EXECUTING LINAKAGE APPLICATION

(71) Applicant: MAXELL, LTD., Kyoto (JP)

(72) Inventors: Naohisa Takamizawa, Kyoto (JP); Yasunobu Hashimoto, Kyoto (JP); Yoshinori Okada, Kyoto (JP)

(73) Assignee: Maxell, Ltd., Kyoto (JP)

( * ) Notice: Subject to any disclaimer, the term of this patent is extended or adjusted under 35 U.S.C. 154(b) by 583 days.

(21) Appl. No.: 18/013,385

(22) PCT Filed: Jul. 2, 2020

(86) PCT No.: PCT/JP2020/026042
§ 371 (c)(1),
(2) Date: Dec. 28, 2022

(87) PCT Pub. No.: WO2022/003912
PCT Pub. Date: Jan. 6, 2022

(65) Prior Publication Data
US 2023/0236874 A1 Jul. 27, 2023

(51) Int. Cl.
*G06F 9/48* (2006.01)
*G06F 9/445* (2018.01)
*G06F 9/54* (2006.01)
(52) U.S. Cl.
CPC ............... *G06F 9/48* (2013.01); *G06F 9/445* (2013.01); *G06F 9/4843* (2013.01); *G06F 9/542* (2013.01); *G06F 2209/482* (2013.01)

(58) Field of Classification Search
None
See application file for complete search history.

(56) References Cited

U.S. PATENT DOCUMENTS

2012/0166994 A1   6/2012  Aonuma et al.
2012/0268611 A1* 10/2012  Kimijima ........... H04N 1/00137
348/207.1
(Continued)

FOREIGN PATENT DOCUMENTS

JP    2010-136238 A   6/2010
JP    2012-146279 A   8/2012
(Continued)

OTHER PUBLICATIONS

Notice of Reasons for Refusal received in corresponding Japanese Patent Application No. 2022-532961, mailed Feb. 20, 2024.
(Continued)

*Primary Examiner* — Abu Zar Ghaffari
(74) *Attorney, Agent, or Firm* — Rimon P.C.

(57) ABSTRACT

Linkage of application software among a plurality of information processing terminals is easily and conveniently realized. An information processing system for executing application software by a plurality of information processing terminals in linkage with each other, each of the information processing terminals including: a detector that detects a predetermined linkage mark; and an execution section that executes, as linkage application software, application software associated with the linkage mark as detected, in linkage with the other information processing terminal which has detected the same linkage mark.

18 Claims, 15 Drawing Sheets

(56) References Cited

U.S. PATENT DOCUMENTS

| | | | | |
|---|---|---|---|---|
| 2014/0184496 A1* | 7/2014 | Gribetz | ................... | G06F 3/017 |
| | | | | 345/156 |
| 2015/0324645 A1* | 11/2015 | Jang | ........................ | G06F 3/013 |
| | | | | 345/633 |
| 2016/0103583 A1* | 4/2016 | Barillaud | ........... | G06F 3/04845 |
| | | | | 715/825 |
| 2017/0077974 A1* | 3/2017 | Aoki | ..................... | H04W 12/06 |
| 2017/0083104 A1 | 3/2017 | Namba et al. | | |
| 2017/0230463 A1* | 8/2017 | Takahashi | ............. | H04W 8/005 |
| 2017/0351325 A1* | 12/2017 | Hashimoto | ........... | A63F 13/213 |
| 2018/0322707 A1* | 11/2018 | Zhang | ................... | G06V 20/20 |
| 2021/0407161 A1* | 12/2021 | Fukushima | ......... | G06F 3/04845 |

FOREIGN PATENT DOCUMENTS

| | | | |
|---|---|---|---|
| JP | 2012-227814 A | 11/2012 | |
| JP | 2016-174253 A | 9/2016 | |
| JP | 2017-59062 A | 3/2017 | |
| JP | 2017-123908 A | 7/2017 | |
| JP | 2017-142693 A | 8/2017 | |

OTHER PUBLICATIONS

International Search Report issued in International Application No. PCT/JP2020/026042, dated Sep. 24, 2020, with English translation.

* cited by examiner

FIG. 4A
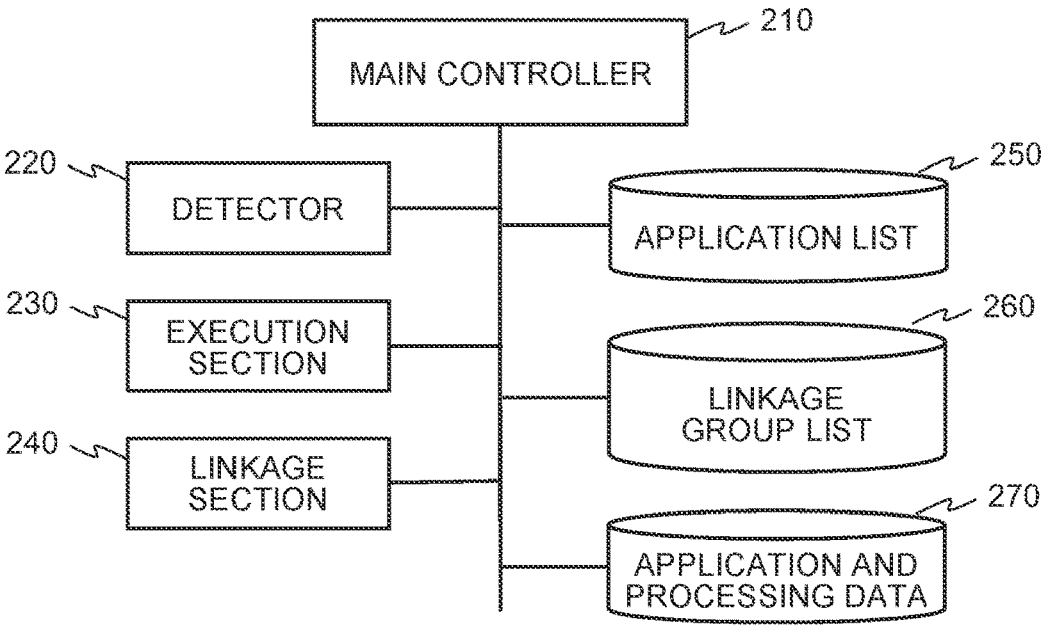
FIG. 4B
250
| APPLICATION ID (251) | MARK DATA (252) | |
|---|---|---|
| | SHAPE DATA (253) | MARK ID (254) |
FIG. 4C
280(280a,280 b )
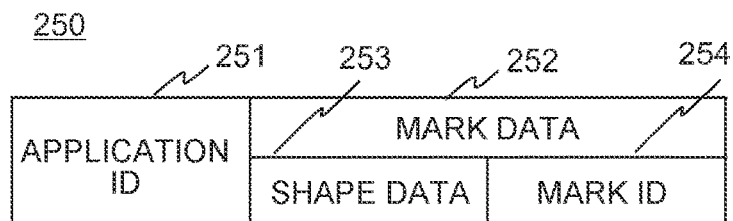
| MARK ID (281) | DEVICE ID (282) | ADDRESS (283) | APPLI-CATION ID (284) | STATUS (285) |
|---|---|---|---|---|
FIG. 4D
260
MARK ID : XXXXX ～ 261
| | LINKAGE TERMINAL | | | | | |
|---|---|---|---|---|---|---|
| DEVICE ID | 102 | 103 | | | | 262 |
| ADDRESS | | | | | | 263 |

FIG. 6

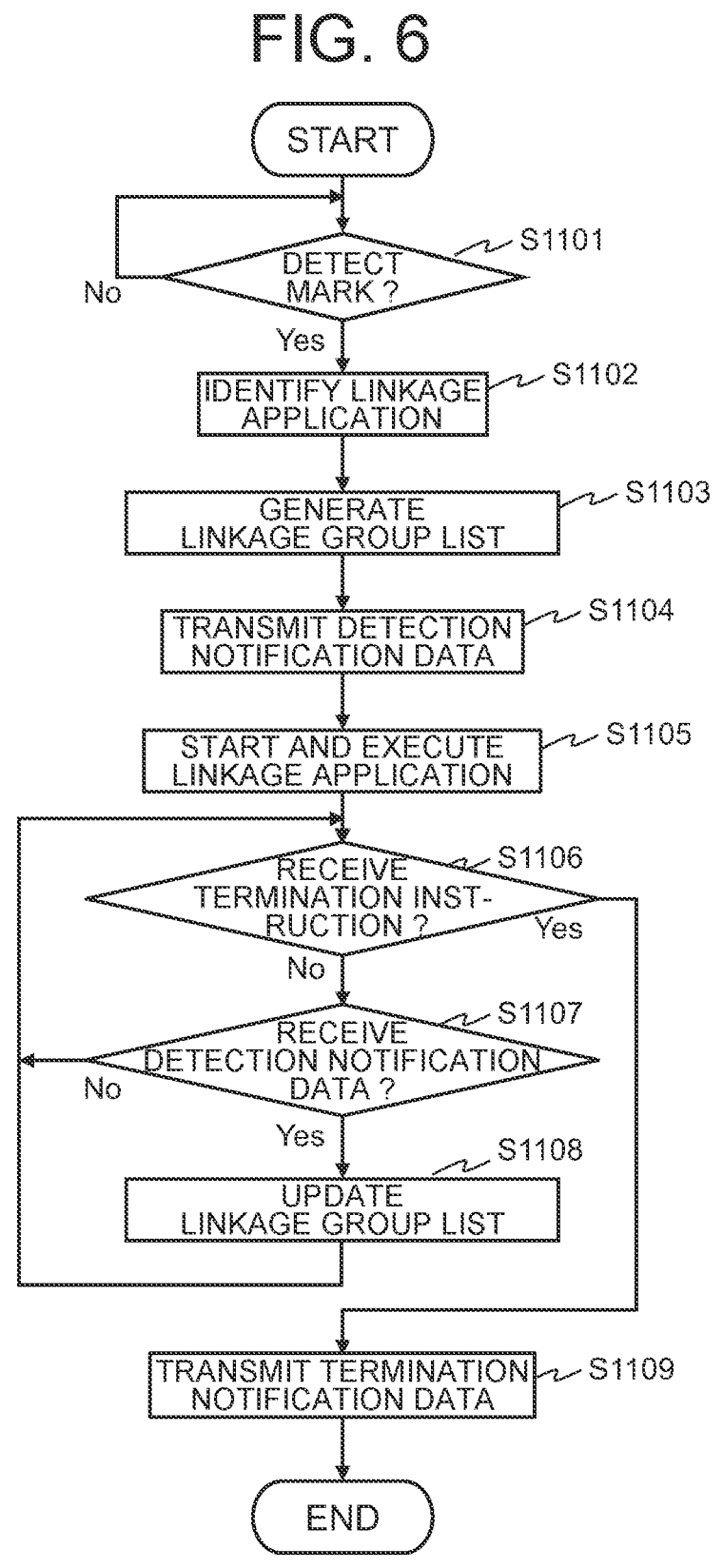

START

S1101
DETECT MARK ?
No
Yes

S1102
IDENTIFY LINKAGE APPLICATION

S1103
GENERATE LINKAGE GROUP LIST

S1104
TRANSMIT DETECTION NOTIFICATION DATA

S1105
START AND EXECUTE LINKAGE APPLICATION

S1106
RECEIVE TERMINATION INST-RUCTION ?
No          Yes

S1107
RECEIVE DETECTION NOTIFICATION DATA ?
No          Yes

S1108
UPDATE LINKAGE GROUP LIST

S1109
TRANSMIT TERMINATION NOTIFICATION DATA

END

MAIN CONTROLLER — 410

400

420 — TRANSMISSION AND RECEPTION SECTION

430 — LINKAGE CONTROLLER

440 — LINKAGE MANAGEMENT SECTION

460 — LINKAGE GROUP LIST

460

MARK ID : XXXX — 461

| | LINKAGE TERMINAL | | | | |
|---|---|---|---|---|---|
| DEVICE ID | 102 | 103 | | | |
| ADDRESS | | | | | |

462

463

400

CPU — 401

MEMORY — 402

STORAGE — 403

COMMUNI-CATION I/F — 404

500

SMARTPHONE

570 MAIN CONTROLLER

571 ACCEPTANCE SECTION

572 TRANSMISSION AND RECEPTION SECTION

573 LINKAGE MANAGEMENT SECTION

574 APPLICATION EXECUTION SECTION

575 OUTPUT SECTION

577 ICON DATA

576 APPLICATION PROGRAM

578 LINKAGE GROUP LIST 822    825

INFORMATION PROCESSING SYSTEM MANAGING MEMBERSHIP OF GROUP OF PLURALITY OF TERMINALS BASED ON DETECTING LINKAGE MARK AND EXECUTING LINAKAGE APPLICATION

CROSS REFERENCE TO RELATED APPLICATIONS

This application is the U.S. National Phase under 35 U.S.C. § 371 of International Application No. PCT/JP2020/026042, filed on Jul. 2, 2020, the entire contents of each are hereby incorporated by reference.

TECHNICAL FIELD

The present invention relates to a technique for supporting execution of application software (hereinafter, referred to as an application) in linkage by a plurality of information processing terminals.

BACKGROUND ART

It is increasingly the case that applications are executed by a plurality of information terminals in linkage with each other. As a technique for selecting an optimal linkage destination device to be linked with a linkage source device, for example, Patent Literature 1 discloses an information processing system "including a linkage-source device, a plurality of linkage destination devices connectable to the linkage source device, and an application linkage device for controlling linkage of applications respectively registered in the linkage source device and the plurality of linkage destination devices, and the application linkage device includes a first management unit that manages information to be used for connection with the linkage destination device and device information including information about data to be used by an application registered in the linkage destination device, a second management unit that acquires linkage candidates showing linkable linkage destination devices and applications, with reference to the device information in response to a linkage request from the linkage source device, and a linkage controller that starts applications shown in the linkage candidates and decides a device to be linked and linkable applications registered in the device as a linkage destination" (excerpted from Abstract).

Furthermore, a technique of controlling linkage among a plurality of devices based on determination of the identity of images captured by the plurality of devices has been known. For example, Patent Literature 2 discloses a determination device "including a first acquisition unit that acquires a first image captured by a first device together with a capturing time, a second acquisition unit that acquires a second image captured by a second device together with a capturing time, a determination unit that determines the identity of capturing positions of the first image and second image based on the images and capturing times of the first image and second image, and an output unit that outputs a determination result to the first device or the second device (excerpted from Abstract)".

CITATION LIST

Patent Literature

Patent Literature 1: JP-A-2017-142693
Patent Literature 2: JP-A-2016-174253

SUMMARY OF INVENTION

Technical Problem

It is increasingly the case that users each wearing an information terminal such as a head-mounted display (HMD) form a group so that they can share an application installed in each of the information terminals and execute it in the group.

Patent Literature 1 teaches establishment of linkage communication to start applications in all information terminals capable of starting the applications, however, fails to disclose the viewpoint of selecting one or more information terminals from them and starts applications. In view of the above, Patent Literature 1 can hardly realize formation of a group of users to allow them to share applications.

Furthermore, Patent Literature 2 teaches linkage of devices with each other based on the identity of captured images, however, fails to disclose start of applications nor linkage thereof.

The present invention has been made in view of the circumstances above, and an object of the present invention is to provide a technique for easily and conveniently realizing linkage of applications among a plurality of information processing terminals.

Solution to Problem

The present invention provides an information processing system for executing application software by a plurality of information processing terminals in linkage with each other comprising the plurality of information processing terminals, wherein each of the information processing terminals including: a detector that detects a predetermined linkage mark; and an execution section that executes, as linkage application software, application software associated with the linkage mark as detected, in linkage with another information processing terminal of the information processing terminals which has detected the same linkage mark.

Advantageous Effects of Invention

According to the present invention, it is possible to easily and conveniently realize linkage of applications among a plurality of information processing terminals. The problems, configurations, and advantageous effects other than those described above will be clarified by explanation of the embodiments below.

BRIEF DESCRIPTION OF DRAWINGS

FIG. 4(a) is a functional block diagram of the HMD according to the first embodiment, FIG. 4(b) is a diagram for explaining an exemplary application list according to the first embodiment, FIG. 4(c) is a diagram for explaining exemplary notification data according to the first embodiment, and FIG. 4(d) is a diagram for explaining an exemplary linkage group list according to the first embodiment.

FIG. 6 illustrates a flowchart of the linkage processing according to the first embodiment.

DESCRIPTION OF EMBODIMENTS

First Embodiment

Figure 1:
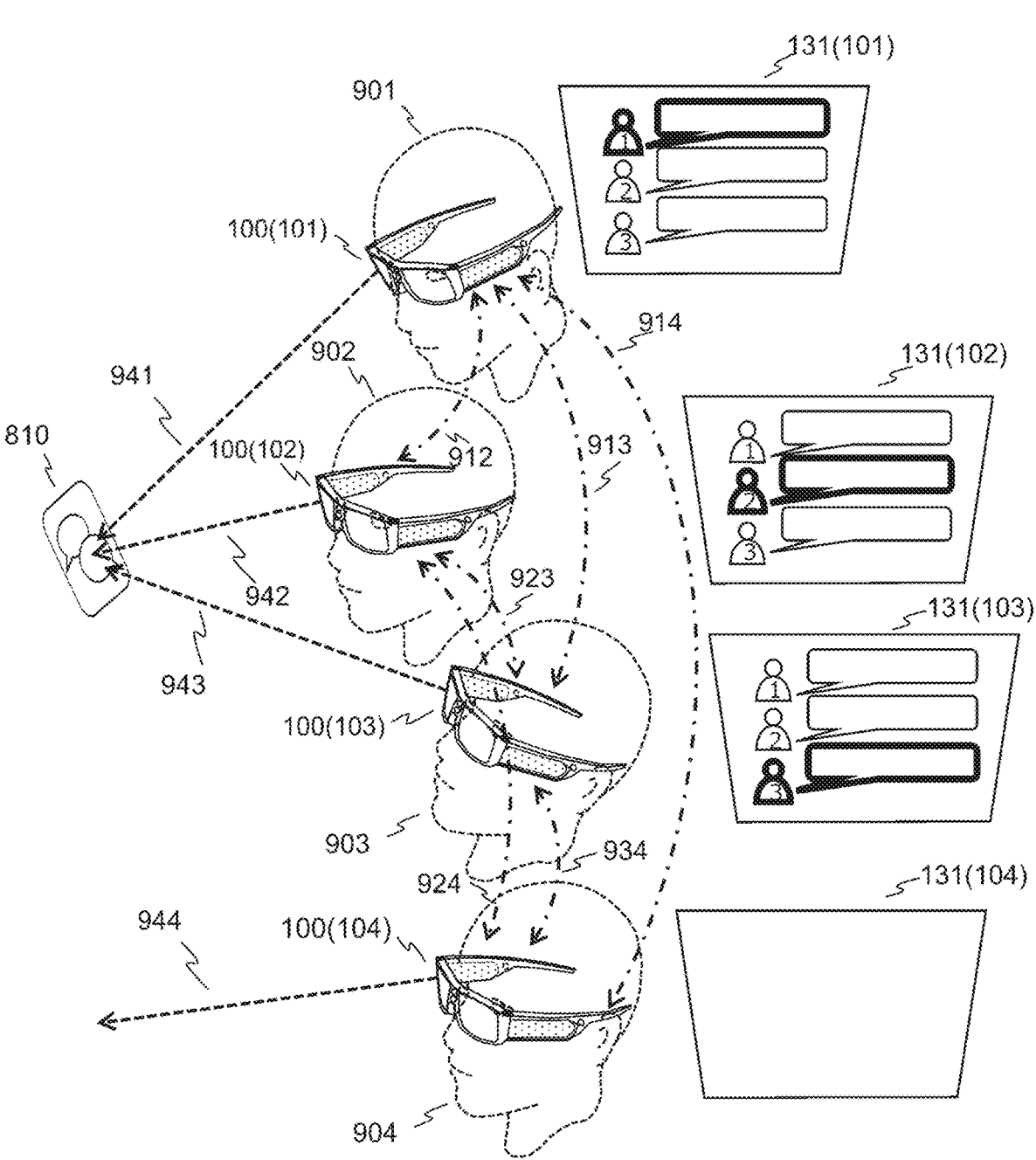
FIG. 1 is a diagram for explaining an outline of an information processing system according to a first embodiment.

Hereinafter, an example of a first embodiment of the present invention will be described with reference to the drawings. FIG. 1 is a diagram for explaining an outline of an information processing system according to the present embodiment.

In recent years, in the fields of games and various kinds of simulations, the technologies of virtual reality (VR) and augmented reality (AR) have been used. Using the virtual reality technology enables creation of a realistically simulated virtual world and allows a user to experience to feel as if he or she is in the virtual world. According to the technology of augmented reality, meanwhile, a virtual space (virtual object) which is created with digital information by use of computer graphics (CG) and the like is reflected and augmented in a real world. As information processing terminals embodying the technologies above, head-mounted displays (HMD) with displays, cameras, and the like to be mounted on the heads of users are widely used. Forming a group of users wearing the information processing terminals such as HMDs and executing the applications installed in the information terminals in linkage with each other enables the users to communicate in the group, for example, for chatting, having meetings, and playing games.

The linkage execution of applications described above is demanded to be performed easily and safely, and it can be realized by the present embodiment.

In the present embodiment, a plurality of users 900 each wearing a head-mounted display (HMD) 100 executes application software (application) commonly installed in the HMDs 100 in linkage with each other. The applications installed in the HMDs 100, respectively, are the same or equivalent ones to be used for performing certain tasks such as chatting, playing music and images, and creating documents.

In order to realize the linkage described above, the users 900 recognize a mark corresponding to applications to be executed. For example, the mark is a figure for calling a function to, for example, start an application, and may be printed or written somewhere, or may be displayed on a screen of an information processing terminal or the like. The mark is not limited to a geometric figure, but may be a character or the like as long as the mark can be used for decision as to which application is to be started. Hereinafter, this mark is referred to as a linkage mark 810. Note that applications started on the HMDs 100 due to recognition of the linkage mark 810 does not have to be the same applications. For example, an application to be started when a user recognizes a chat mark may be any application as long as it allows the user to be linked with other users and chat therewith.

FIG. 1 illustrates HMDs 101, 102, 103, 104 attached to the heads of four users 901, 902, 903, 904, respectively, and the linkage mark 810. In the following, the users and the HMDs will be exemplified as the users 900 and the HMDs 100, respectively, if there is no need to distinguish them.

The HMDs 100 use wireless communication 912, 913, 914, 923, 924, 934 to transmit and receive data with each other. Note that data may be transmitted and received among the HMDs 100 not only by direct and mutual wireless communication but also through servers and the like.

In FIG. 1, the HMDs 101, 102, 103 detect that the users 901, 902, 903 thereof have recognized the linkage mark 810 located ahead of line of sights 941, 942, 943 of the users 901, 902, 903, and identify the applications corresponding to the linkage mark 810 as applications (linkage applications) to be executed in linkage with each other.

In addition, as the HMDs 100 that have detected the same linkage mark 810, the HMD 101, 102, 103 are identified as members of a linkage group for executing the linkage applications in linkage with each other by the wireless communication 912, 913, 923. Then, the HMDs 101, 102, 103 which are identified as the members of the linkage group execute the linkage applications in linkage with each other.

For example, as illustrated in FIG. 1, it is assumed that the linkage applications corresponding to the linkage mark 810 are chat applications. In this instance, the HMDs 101, 102, 103 execute the corresponding chat applications in linkage with each other. Displays 131 of the HMDs 101, 102, 103 display chat screens showing the content of conversation of the users 900, respectively.

On the other hand, the user 904 of the HMD 104, whose line of sight 944 is not directing toward the linkage mark 810, has not recognized the linkage mark 810. That is, the HMD 104 has not detected the linkage mark 810 and thus does not identify the application corresponding to the linkage mark 810 as the linkage application, and accordingly, is not included in the linkage group for executing the linkage applications in linkage. Thus, the display 131 of the HMD 104 does not display the chat screen showing the content of conversation of the users 900.

For example, when using a chat application or the like, in many cases, a user needs to select a chat partner or a chat group after starting the application. However, in the present embodiment, the user 900 who wants to join the chat simply looks at the linkage mark 810 associated with the chat application, whereby the chat application is automatically started and the HMD 100 of the user 900 who is looking at the same linkage mark 810 is recognized as a member of the linkage group. As described above, according to the present embodiment, the linkage group for executing applications in linkage is automatically formed with only the HMDs 100 worn by the users 900 who are looking at the same linkage mark 810 on the spot. In addition, the linkage applications are identified only when the users 900 wearing the HMDs 100 recognize the linkage mark 810 (HMDs 100 detect the linkage mark 810). This makes it unnecessary for a user to select members of the linkage group or to start the linkage application.

Furthermore, the HMD 100 of the user 900 who is not looking at the linkage mark 810 cannot join the linkage group. This prevents the HMD 100 of the unintended user 900 from erroneously being added as a member of the linkage group. In other words, only the HMDs 100 of the users 900 who are present can join the linkage group. This can eliminate the risk of transmission of data to the HMD 100 of the user 900 who is not on the spot by mistake, thus enables the linkage group to be formed safely. Still further, even in a situation where the users 900 frequently joins and leaves the group, the members of the linkage group can be easily managed.

[System Configuration]

Figure 2:
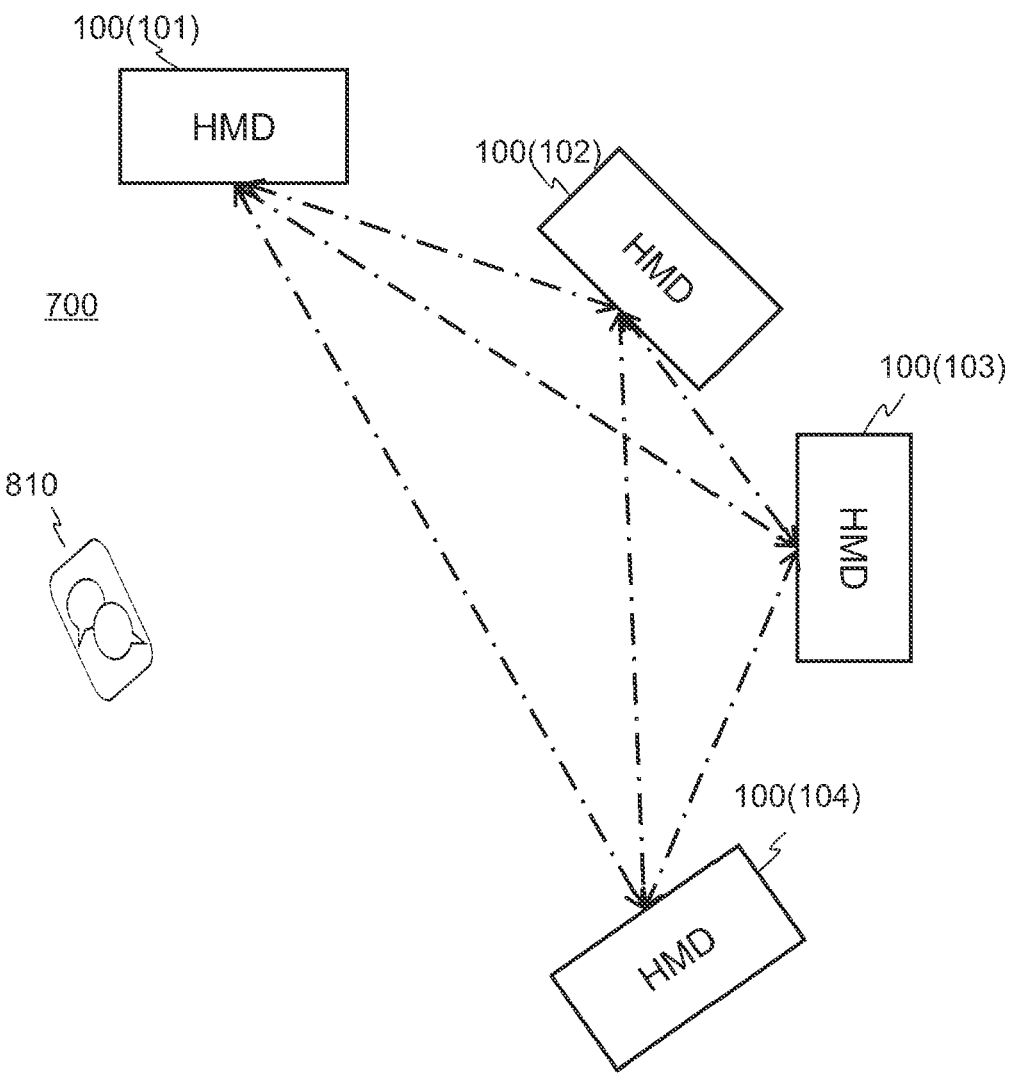
FIG. 2 is a configuration diagram of the information processing system according to the first embodiment.

Hereinafter, firstly, a system configuration of an information processing system 700 according to the present embodiment for realizing the above will be described. FIG. 2 is a system configuration diagram of the information processing system 700 according to the present embodiment.

As illustrated in FIG. 2, the information processing system 700 according to the present embodiment includes a plurality of HMDs 100 (101, 102, 103, 104) and the linkage mark 810.

The HMD 100 is a device that is worn on the head of the user 900 and displays the processed information on the display 131. The HMD 100 according to the present embodiment has the shape of eyeglasses, and includes the display 131 at the positions of lenses of the eyeglasses. The display 131 may be transparent or non-transparent.

The HMD 100 allows the user 900 to observe the situation of the real space through the display 131. In addition, the HMD 100 can display AR objects of the augmented reality on the display 131. This enables the user 900 to simultaneously view both an AR object displayed on the display 131 and the situation of the real space.

As described above, the linkage mark 810 is a mark that, upon being detected, serves as a reference used for identification of the linkage application and authorization of the members of the linkage group. As described above, for example, an icon figure of the linkage application or the like is used as the linkage mark 810. In the present embodiment, the linkage mark 810 is, for example, fixed at a predetermined position such as a wall, column, or desk.

[HMD]

Next, a hardware configuration and functional blocks of the HMD 100 according to the present embodiment will be described with reference to the drawings.

[Hardware Configuration]

Figure 3:
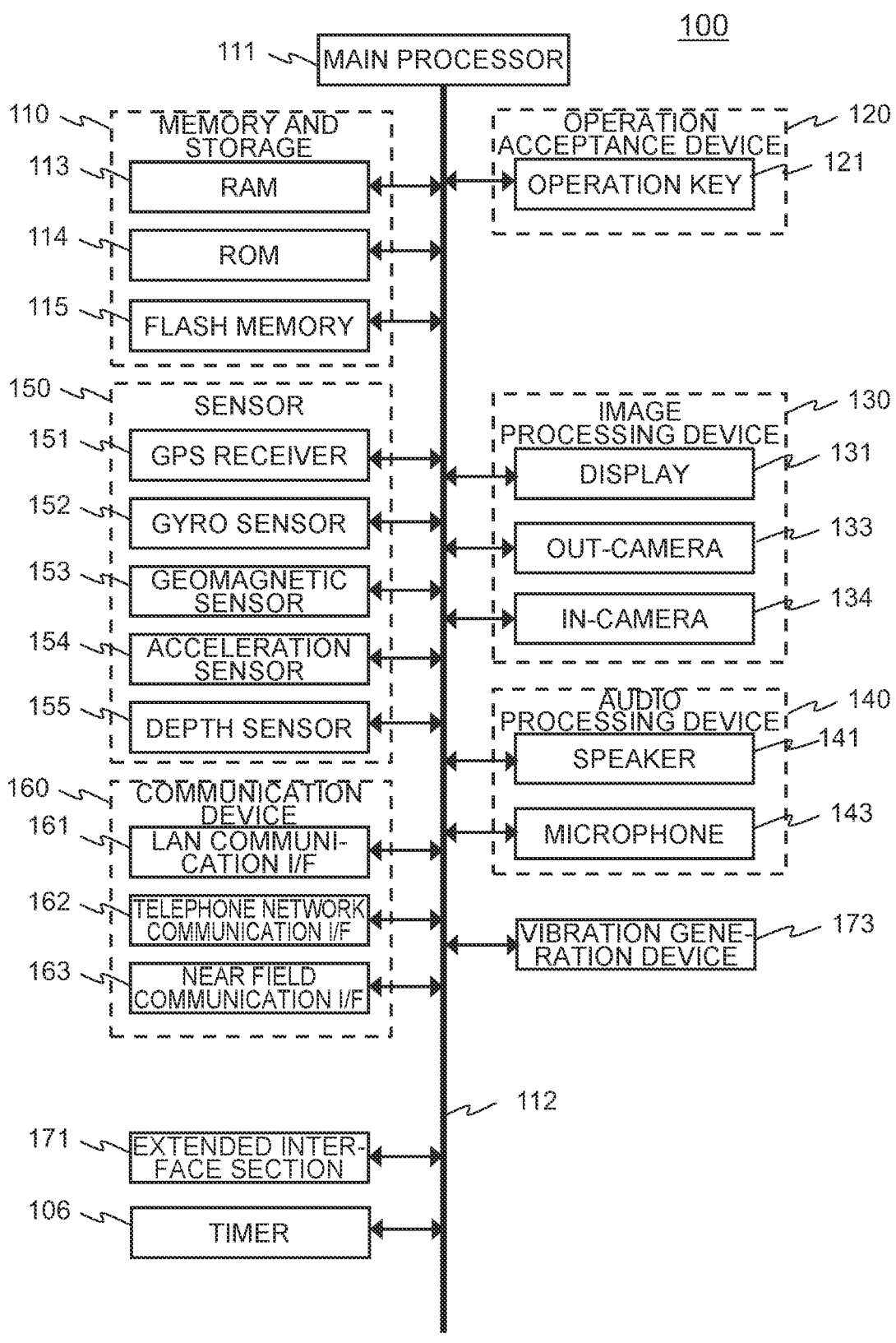
FIG. 3 is a hardware configuration diagram of an HMD according to the first embodiment.

Hereinafter, a hardware configuration of the HMD 100 according to the present embodiment for realizing the processing described above will be explained. FIG. 3 is a block diagram illustrating an exemplary configuration of the HMD 100 according to the present embodiment. In FIG. 3, the same components as those illustrated in FIG. 1 and FIG. 2 are provided with the same reference signs.

As illustrated in FIG. 3, the HMD 100 according to the present embodiment includes a main processor 111, a system bus 112, a memory and storage 110, an operation acceptance device 120, an image processing device 130, an audio processing device 140, a sensor 150, a communication device 160, an extended-interface (I/F) section 171, a timer

172, and a vibration generation device 173. The components are connected to each other via the system bus 112 except for a transmission and reception antenna.

The main processor 111 is a main controller that controls the overall operations of the HMD 100 in accordance with a predetermined program. The main processor 111 is implemented by a CPU (Central Processor Unit) or a microprocessor unit (MPU). The main processor 111 executes programs such as an operating system (OS) and various operation control applications stored in the memory and storage 110 so as to perform processing for controlling the overall operations of the HMD 100. Furthermore, the main processor 111 controls operations of starting various applications. The main processor 111 performs the processing in accordance with a clock signal measured and output by the timer 172.

The system bus 112 is a data communication path for transmitting and receiving data between the main processor 111 and each section provided in the HMD 100.

The memory and storage 110 includes a RAM 113, a ROM 114, and a flash memory 115. The memory and storage 110 retains programs such as an operating system and various operation control applications for music, images, documents, and the like. In addition, information data such as base data necessary for basic operations performed by the operating system and file data started by various applications are stored in the memory and storage 110. For example, when the user starts a music application installed in the HMD 100 and selects music file data, the HMD 100 plays the file data of the selected music, thereby allowing the user to listen to the desired music.

The RAM 113 is a program area during execution of a basic operation program or other application programs. The RAM 113 is a temporary storage area for temporarily retaining data as necessary. The RAM 113 may be integrated with the main processor 111.

Each of the ROM 114 and the flash memory 115 retains various programs for realizing the functions of the HMD 100, operation setting values, sensor information including values detected by the sensor 150 which will be described later, and various kinds of data for display such as virtual objects and content.

The flash memory 115 retains operation programs downloaded from a network 300 and various kinds of data created by the operation programs. Through download processing from each server device on the network 300, each of the operation programs stored in the flash memory 115 can be updated and enhanced.

Furthermore, the flash memory 115 can retain content such as moving images, still images, and sounds downloaded from the network 300. In addition, the flash memory 115 can retain data such as moving images and still images captured by an in-camera 134 or an out-camera 133.

The ROM 114 and flash memory 115 are so-called nonvolatile storages that retain stored data even when power is not supplied to the HMD 100 from the outside. Hereinafter, the ROM 114 and the flash memory 115 are collectively referred to as an internal memory storage when there is no need to distinguish them from each other. The main processor 111 loads new application programs stored in the internal memory storage onto the RAM 113 and executes them, whereby the HMD 100 can realize the various functions.

The internal memory storage needs to hold stored information even while the HMD 100 is not being supplied with power. Accordingly, as the internal memory storage, a device such as a flash ROM, a solid-state drive (SSD), or a hard disc drive (HDD) is used.

The internal memory storage retains programs such as an operating system and applications for controlling various operations such as chat, music, images, and documents. In addition, the internal memory storage retains information data such as base data necessary for basic operations by an operating system and file data started by various applications.

For example, a user starts the chat application installed in the HMD 100 and selects various kinds of file data necessary for chat operations, such as a chat partner or content of the previous chat, whereby the user of the HMD 100 can talk with a desired chat partner using the selected chat file data. Furthermore, the user starts the music application installed in the HMD 100 and selects the music file data, whereby the HMD 100 plays the music file data of the selected music so that the user can listen to the desired music.

The operation acceptance device 120 accepts input of an operation instruction to the HMD 100. In the present embodiment, the operation acceptance device 120 includes operation keys 121. The operation keys 121 are, for example, a power key, a volume key, and a home key.

Note that the HMD 100 according to the present embodiment does not necessarily have to include all the elements of the operation acceptance device 120. The operation acceptance device 120 may be provided at a position or in a form allowing the user 901 to easily perform an input operation on the HMD 100.

The HMD 100 may accept an operation instruction to the HMD 100 via a separate information processing terminal device connected thereto by wired communication or wireless communication. In this case, for example, an input means such as a keyboard, a key button, a touch key, and the like may be provided. Alternatively, the operation acceptance device 120 may be configured to function using the line of sight of the user 901. In this case, for example, displaying an input operation screen on the display 131 and capturing a position on the input operation screen to which the line of sight of the user 901 detected by the in-camera 134 is directed enables acquisition of the input operation information. Alternatively, displaying a pointer on the input operation screen and operating it also enables the acquisition of the input operation information. The input operation information may be captured by collecting voices uttered by the user 901 which express an input operation with a microphone 143 which will be described later. Furthermore, the input operation information may be captured by detecting the motion (gesture) of the hand or body of the user 901 using the out-camera 133 and the various sensors 150.

The image processing device 130 is an image (video) processor, and includes the display 131, the out-camera 133, and the in-camera 134.

The display 131 is, for example, a display device (display) such as a liquid crystal panel, and provides a user of the HMD 100 with image data processed by an image signal processor. The display 131 includes a left-eye display and a right-eye display. The display 131 may be a transparent type (optical see-through) display or a non-transparent type (video see-through) display.

The optical see-through display includes a projection unit that projects various kinds of information such as playing information by applications which have been active and notification information to the user 901, and a transparent half mirror that forms and displays projected various kinds of information in front of the eyes. The video see-through display includes a liquid crystal panel or the like that displays an image of a real space object in front of the eye captured by the out-camera 133 together with various kinds of information. The display 131 allows the user 901 to view not only images within the field of view in front of the eye, but also information about chat conversations, music, images, documents, and the like by the active applications.

The display 131 displays notification information to a user such as the remaining battery capacity, various alarms, and time. The display 131 also displays an icon of an application to be started.

The image signal processor is an image (video) signal processer that processes images input from the out-camera 133 and the in-camera 134. Furthermore, the image signal processor superimposes an object created by the main processor 111 on the input image and outputs it to the display 131. The image signal processor may be implemented by the main processor 111 or a processor dedicated to images and provided separately from the main processor 111.

Each of the in-camera 133 and the out-camera 134 converts the light received through a lens into an electric signal using an electronic device such as a charge coupled device (CCD) or a complementary metal oxide semiconductor (CMOS) sensor to input image data of the surroundings and that of an object.

The out-camera 133 acquires images of the surroundings of the HMD 100. The out-camera 133 is installed on the front of the HMD 100 to capture images of a field-of-view condition in the front. The HMD 100 may be an optical see-through type HMD or a video see-through type, and both of them are designed to capture images of a field-of-view condition in front of the eyes by the out-camera 133 and acquire the data thereof.

The in-camera 134 captures images of a region different from an image acquisition region of the out-camera 133. For example, the in-camera 134 captures images of the eye of the user. In the present embodiment, the in-camera 134 functions not only as a processor that performs line-of-sight identification processing but also as a line-of-sight detection sensor.

The line-of-sight detection sensor includes a right line-of-sight detector and a left line-of-sight detector, which detect the line of sight of the right eye and the line-of-sight of the left eye, respectively. Note that a well-known technique commonly used as the eye tracking processing may be employed to detect the line of sight. For example, in a method using corneal reflection, irradiating an infrared LED (light emitting diode) to the face, capturing an image thereof using an infrared camera, and using a position on the cornea of the reflected light (corneal reflection) obtained by irradiation of the infrared LED as a reference point enables detection of a line of sight based on a position of the pupil with respect to the position of the corneal reflection. In this case, an infrared camera and an infrared LED are provided.

The operation acceptance device 120 may be configured to display an input operation screen on a display screen of the display 131 so as to capture the input operation information based on a position on the input operation screen to which the line of sight of the user detected by line-of-sight sensors for left and right eyes is directed. The input operation information may be captured by displaying a pointer on the input operation screen so as to allow the pointer to be operated thereon by the operation acceptance device 120.

The audio processing device 140 is an audio processor that processes sounds, and includes a speaker 141 and the microphone 143.

The speaker 141 outputs an audio signal processed by an audio signal processor to the outside. The speaker 141 functions to output sounds to the outside, by which a user is notified with the notification information, music, and the like. In the case of the HMD 100, for example, a headphone may be used.

The microphone 143 collects voices of a user or the like, converts them into audio data, and inputs the same. For example, the microphone 143 may include an ambient microphone and a voice microphone. These microphones collect ambient sounds and voices of the user 901. The microphone 143 may be connected to a headphone which is worn on the ear of the user 901 so as to acquire the sounds provided to the user 901. A headphone can notify the user 900 of the notification information. Note that the input operation information can be captured by using the microphone 143 as the operation acceptance device 120 to collect the voices indicating an input operation uttered by the user 900.

The sensor 150 is a group of sensors for detecting the condition of the HMD 100. In the present embodiment, the sensor 150 includes a GPS (Global Positioning System) receiver 151, a gyro sensor 152, a geomagnetic sensor 153, an acceleration sensor 154, and a depth sensor 155. Providing the group of sensors enables detection of the position, motion, tilt, direction, and the like of the HMD 100. The depth sensor 155 acquires distance information from the HMD 100 to an object. Note that other sensors may be further provided.

The acceleration sensor 154 is a sensor for detecting the acceleration, which expresses the change in speed per unit time, and can capture the motion, vibration, impact, and the like. The gyro sensor 152 is a sensor for detecting the angular velocity in the rotational direction, and can capture the state of the vertical, horizontal, and oblique attitudes. Using the acceleration sensor 154 and the gyro sensor 152 mounted on the HMD 100 enables detection of the motion of the HMD 100.

The geomagnetic sensor 153 is a sensor for detecting the magnetic force of the earth, and detects the orientation in which the HMD 100 is directed. In the case of using a three-axis sensor capable of detecting the geomagnetism in the front and rear direction, left and right direction, and further upper and lower direction, capturing the geomagnetic change with respect to the motion of the HMD 100 enables detection of the motion of the HMD 100.

The depth sensor 155 is a sensor capable of capturing the shape of a target such as a human or an object as a three-dimensional object. The depth sensor 155 may be a LiDAR (Light Detection and Ranging) sensor configured to irradiate a laser beam such as an infrared ray onto the target, measure a scattered light which has been reflected, and analyze and detect the distance to the target at a long distance and the state of the target, a TOF (Time Of Flight) sensor configured to measure a reflected time of a pulse light irradiated onto the target for each pixel to obtain the distance, or a millimeter wave radar configured to emit radio waves in the millimeter wave band, capture the reflected waves, and detect the distance to the target and the state of the object.

The communication device 160 is a communication interface for wirelessly communicating with other information terminals in the vicinity and by the near field communication, wireless LAN, or base station communication. In the wireless communication, the communication device 160 transmits and received data via a transmission and reception antenna. In the present embodiment, the communication device 160 transmits and receives participation ID information collecting all IDs of the information terminals participating in the linkage execution of the application, application start instruction information, file data to be played by an active application, and the like.

The communication device 160 includes a LAN (Local Area Network) communication interface (I/F) 161, a telephone network communication I/F 162, and a near field communication I/F 163.

The LAN communication I/F 161 is connected to the network 300 such as the Internet via a wireless access point or the like, thereby realizing transmission and reception of data to and from servers on the network 300. Wi-Fi (registered trademark) or Bluetooth (registered trademark) may be used for connection to a wireless access point.

The telephone network communication I/F 162 is connected to a communication network using a mobile telephone communication network, thereby realizing transmission and reception of data to and from servers on a communication network. The communication system to be used is, for example, the third-generation mobile communication system (hereinafter referred to as "3G") such as GSM (registered trademark) (Global System for Mobile Communications), W-CDMA (Wideband Code Division Multiple Access), CDMA 2000, and UMTS (Universal Mobile Telecommunications System), or the communication system such as LTE (Long Term Evolution), the fourth generation (4G), and the fifth generation (5G).

The near field communication I/F 163 is an interface for near field communication. Near-field communication is a communication method allowing the HMDs 100 in the vicinity to directly transmit and receive data with each other. In the present embodiment, for example, an electronic tag is used for near field communication. Electronic tag is a communication method using a RFID (Radio Frequency Identification) technology enabling reading and writing data in an IC chip in a contactless manner using radio waves.

However, near field communication is not limited thereto, and any method may be used as long as it is a method enabling the HMD 100 to communicate with other information terminals located nearby at least wirelessly. To realize the near field communication, for example, communication according to Bluetooth standard, infrared data communication using IrDA (Infrared Data Association, registered trademark), or communication using Zigbee (registered trademark) or HomeRF (Home Radio Frequency, registered trademark) may be used. Alternatively, it may be realized using a wireless LAN such as Wi-Fi (registered trademark) or using an ultra-wideband system (Ultra Wide Band: UWB).

The LAN communication I/F 161, the telephone network communication I/F 162, and the near field communication I/F 163 include encoding circuits, decoding circuits, and antennas, respectively.

As a means of wireless communication, the communication device 160 may use other approaches such as optical communication using sound waves. In this case, a light emission and reception section and a sound wave output and input section are used instead of a transmission and reception antenna.

A high-speed and high-capacity communication network such as 5G (5th generation mobile communication system) or local 5G for wireless data communication may be used for image applications for high-resolution videos which require a very large amount of data. This can prevent delay in displaying due to increase in an amount of data and deterioration in quality due to loss of data during transferring, thereby improving the usability.

The extended interface section 171 is a group of interfaces for extending the functions of the HMD 100, and in the present embodiment, the extended interface section 171 includes a charging terminal, a video and audio interface, a USB (Universal Serial Bus) interface, a memory interface, and the like. The video and audio interface inputs video signals and audio signals output from an external video and audio output device, and outputs video signals and audio signals to an external video and audio input device. The USB interface is used for connection to SB devices. The memory interface is used for connection with a memory card and other memory media and thus transmission and reception of data.

The vibration generation device 173 is controlled by the main processor 111 to generate vibration, and converts the notification information transmitted from the HMD to a user into vibration. The vibration generation device 173 generates the vibration at the head of a user who is closely wearing the HMD, thereby reliably letting the user know the notification.

Note that a part of the exemplary configuration of the HMD 100 illustrated in FIG. 3 is not essential to the present embodiment. Accordingly, even if the configuration of the HMD 100 does not include such an unessential component, the advantageous effects of the present embodiment are not impaired. In this connection, the configuration of the HMD 100 may further include components which are not illustrated, for example, a digital broadcast reception function and an electronic money settlement function.

[Functional Blocks of HMD]

Next, a functional configuration of the HMD 100 according to the present embodiment will be described. FIG. 4(a) is a functional block diagram of a configuration of the HMD 100 according to the present embodiment. As illustrated in FIG. 4(a), the HMD 100 includes a main controller 210, a detector 220, an execution section 230, and a linkage section 240. The HMD 100 further includes, as data used for the processing, an application list 250, a linkage group list 260, and an application and processing data 270.

The main controller 210 controls the entire operations of the HMD 100, The main controller 210 executes programs such as an operating system (OS) and various operation control applications so as to perform the processing for controlling the overall operations of the HMD 100.

Figure 5A:
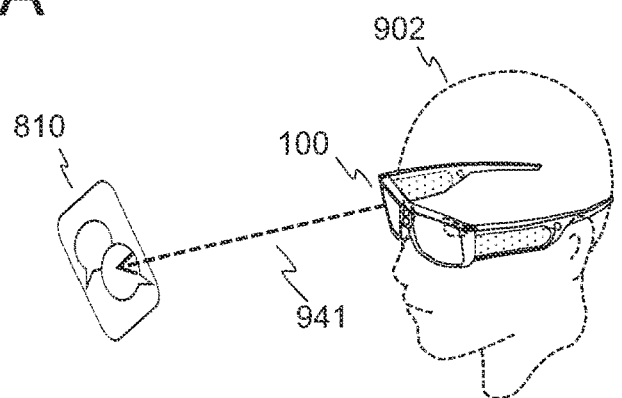
FIG. 5(a) to FIG. 5(c) are diagrams for explaining detection of a linkage mark according to the first embodiment.
Figure 5B:
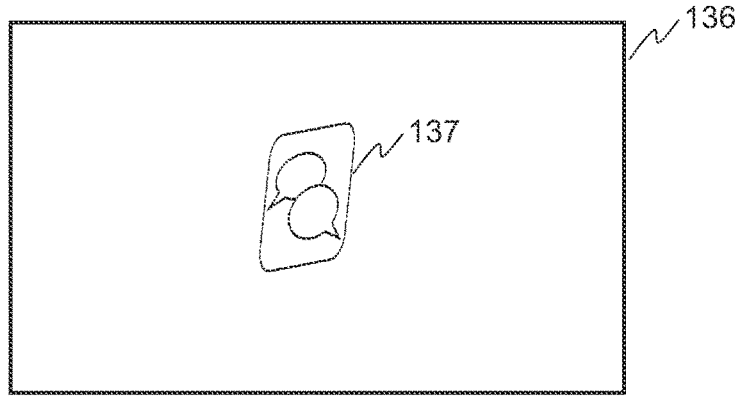

The detector 220 detects the linkage mark 810 associated with the application. In the present embodiment, as illustrated in FIG. 5(a) and FIG. 5(b), the detector 220 captures an image around the HMD 100 (range of field of view) with the out-camera 133, and analyzes the acquired image (captured image 136). When an area 137 that matches the figure registered in association with the application in the application list 250 at a predetermined ratio is included within the captured image, it is assumed that the detector 220 detects the linkage mark 810.

Here, the application list 250 will be described. The application list 250 is a list in which data (mark data) of the linkage mark 810 is stored in association with an application. In the present embodiment, as illustrated in FIG. 4(b), mark data 252 is registered in association with application identification information (application ID (identification) 251) which is information identifying the application. The mark data 252 includes, for example, shape data 253 of the mark and mark identification information (mark ID 254) that is information identifying the mark.

The application list 250 is registered, for example, when the application is installed. The mark data 252 may be, for example, icon data used for starting the application. The mark data 252 may be updated (changed or added) when the application is updated. The mark data 252 is not limited to one type for one application.

While a linkage application is not being executed, the detector 220 analyzes the captured image 136 at predetermined time intervals to determine whether the area 137 corresponding to the shape data 253 registered in the application list 250 is included within the captured image 136. The detector 220 makes determination as to whether the area 137 (figure) corresponding to the linkage mark 810 is present in the captured image 136 by pattern matching or the like. When the area 137 is included, the detector 220 determines that the linkage mark 810 is detected. Note that, in order to reduce power consumption or avoid linkage from being established even if the linkage mark 810 is recognized, the detector 220 may be configured to start the detection operations upon receiving an instruction or the like from the user 900.

When detecting the linkage mark 810, the detector 220 identifies the application registered in the application list 250 in association with the detected mark data 252 as an application to be executed in linkage (linkage application).

Note that the detector 220 may be configured to start the above-described analyzing process upon receiving an instruction to detect a mark from the user 900.

Furthermore, for example, when a mark not stored as the mark data 252 in the application list 250 is extracted from the captured image 136, the detector 220 may inquire a server or the like on the network to determine whether the server has an application associated with the mark. In the case where the server has the application associated with the mark, the detector 220 downloads the application together with the mark, and store the mark in association with the application ID 251 in the application list 250. The application per se is stored in the application and processing data 270.

Note that a reference may be set in the linkage mark 810 in advance, such as the size, shape, type of a frame line, and the like so that, in the process of detection, whether the extracted mark is the linkage mark 810 corresponding to the linkage application or merely a figure can be determined.

Figure 5C:
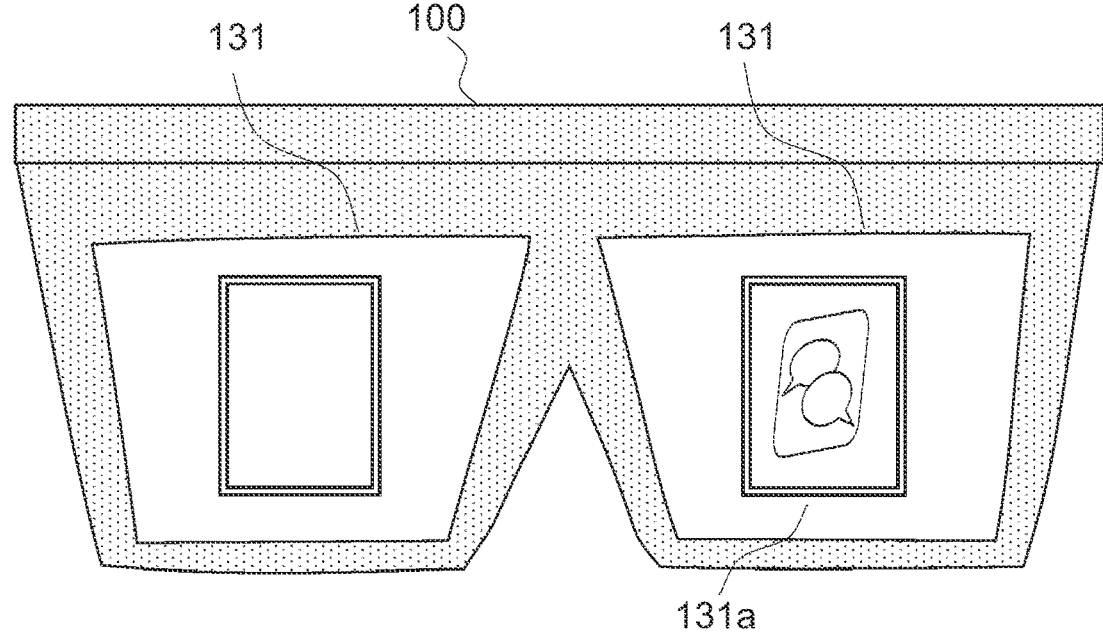

In the case where, in the out-camera 133, the entire range of an image capturing visual field is not set as the detection range, as illustrated in FIG. 5(c), whether the linkage mark 810 can be detected is determined based on whether the relevant linkage mark 810 is included within a predetermined area (linkage visual field 131a) in the image capturing visual field. The linkage visual field 131a may be predetermined, or for example, may be set to a predetermined area whose center is on an intersection of the line-of-sight direction of the user 900 and the image capturing visual field.

The execution section 230 starts and executes the application identified by the detector 220 as a linkage application. The application is stored in the application and processing data 270 in association with the application ID 251 identified by the detector 220. The execution section 230 executes the application in linkage with other HMDs 100.

The application and processing data 270 is various kinds of file data on an application or necessary for executing the application. The execution section 230 uses the data so as to start and execute a desired linkage application. While executing an application in linkage, the execution section 230 transmits and receives data to and from the plurality of HMDs 100 via the communication device 160.

The linkage section 240 manages the HMDs 100 which have detected the same linkage mark 810 as members of the linkage group. In the present embodiment, the linkage section 240 manages the relevant HMDs 100 among the HMDs 100 capable of communicating with each other within the communication range of the near field communication.

When the status in the HMD 100 changes, the linkage section 240 generates notification data for notifying the change, and transmits the notification data to the surrounding HMDs 100. In the present embodiment, for example, when detecting the linkage mark 810, the linkage section 240 generates the notification data indicating the detection of the linkage mark 810. When the linkage application being executed has been terminated, the linkage section 240 generates notification data indicating that the termination of the linkage application.

Here, the notification data 280 generated by the linkage section 240 will be described. As illustrated in FIG. 4(*c*), in the notification data 280, a mark ID 281 that is information identifying the detected linkage mark 810, terminal identification information (device ID 282) that is information identifying the HMD 100 per se, an address 283 of the HMD 100, an application ID 284 that is information identifying the linkage application, and information indicating a status (in this case, detection or termination; status 285) are registered. The device ID 262 of each HMD 100 is set in advance. The address 283 is used, for example, for linkage of the linkage applications via a network such as LAN. The address 283 may be used as the device ID 282.

For example, when the detector 220 detects the linkage mark 810, the linkage section 240 generates and transmits the notification data 280 in which the "detection" is registered in the status 285 (hereinafter, detection notification data 280*a*). When the linkage application is terminated, the linkage section 240 generates and transmits the notification data 280 in which the "termination" is registered in the status 285 (hereinafter, termination notification data 280*b*). The linkage section 240 transmits the notification data 280, for example, by near field communication.

In the present embodiment, the detection notification data 280*a* also serves as inquiry data inquiring whether the same linkage mark 810 has been detected. When receiving, from other HMDs 100, the detection notification data 280*a* indicating that the mark ID 281 is the same as the mark ID 254 of the linkage mark 810 detected by the own device, the linkage section 240 returns, to the transmission source HMD 100, the detection notification data 280*a* to show that the own device has also detected the same linkage mark 810. This allows the HMD 100 which joined the linkage group from the middle to obtain the information of all the HMDs 100 which had already joined the group.

Furthermore, when the linkage mark 810 is detected, the linkage section 240 generates and manages a linkage group list 260. As illustrated in FIG. 4(*d*), the linkage group list 260 is a list used to manage the HMDs 100 that execute the linkage applications in linkage with each other as members of the linkage group. The linkage group list 260 includes a mark ID storage location 261 for retaining the mark ID of the linkage mark, the device ID 262 and address 263 of the HMD 100 in the linkage group.

When the linkage mark 810 is detected, firstly, the linkage section 240 generates the linkage group list 260 and registers the mark ID (A) corresponding to the detected linkage mark 810 in the mark ID storage location 261 of the linkage group list 260. Thereafter, upon receiving the detection notification data 280*a* of the mark ID (A) which is the same as the mark ID (A) registered in the mark ID storage location 261 of the linkage group list 260, the linkage section 240 registers the device ID 282 and address 283 included in the detection notification data 280*a* in the device ID 262 and address 263 of the linkage group list. Upon receiving the termination notification data 280*b* of the mark ID (A) which is the same as the mark ID (A) registered in the mark ID storage location 261 of the linkage group list 260, the linkage section 240 deletes the data having the device ID 282 and address 283 included in the termination notification data 280*b* from the linkage group list 260.

Thus, the linkage section 240 transmits and receives the notification data 280 and updates the linkage group list 260 in response thereto, thereby managing the HMDs 100 belonging to the linkage group. In the present embodiment, each of all the HMDs 100 which have detected the same linkage mark 810 to execute the linkage applications generates and manages the linkage group list 260 in the similar manner with each other. This allows the HMDs 100 to share the linkage group list 260.

The main processor 111 loads programs stored in the ROM 114 into the RAM 113 and executes them, whereby the functions described above are realized. Each of the list and data is stored in the memory and storage 110.

According to the configuration described above, capturing an image of the visual field in front of the HMD 100 by means of the out-camera 133 and acquiring the linkage mark 810, for example, an icon in the image capturing visual field or the linkage visual field 131*a* enables the HMD 100 to execute the application associated with the linkage mark 810 as the linkage application in linkage with other terminals.

[Linkage Processing]

Next, a flow of the linkage processing according to the present embodiment will be described with reference to FIG. 6. In the following, the processing by one HMD 100 will be described.

The detector 220 detects the linkage mark 810 (step S1101) and then identifies the application registered in the application list 250, in association with the detected linkage mark 810 as the linkage application (step S1102).

The linkage section 240 generates the linkage group list 260 (step S1103), and transmits the detection notification data 280*a* to the surrounding HMDs 100 by near field communication (step S1104). Note that the linkage section 240 may either generate the linkage group list 260 or transmit the detection notification data 280*a* first.

The execution section 230 starts the linkage application and keeps executing the linkage application until it receives an instruction to terminate the application (step S1105, step S1106).

Upon receiving the detection notification data 280*a* from the surrounding HMDs 100 during execution of the linkage application (step S1107), the linkage section 240 updates the linkage group list 260 in the case where the detection notification data 280*a* has the mark ID 281 which is the same as the linkage mark 810 detected by the own device (step S1108). Here, the linkage section 240 adds the device ID 282 and address 283 in the detection notification data 280*a* to the linkage group list 260. Thereafter, the execution section 230 executes the linkage application based on the updated linkage group list 260.

Upon receiving an instruction to terminate the linkage application, the execution section 230 terminates the linkage application. The linkage section 240 transmits the termination notification data to the surrounding HMDs 100 (step S1109), whereby the processing is ended.

As described above, in the information processing system 700 according to the present embodiment, the HMDs 100, which are information processing terminals, execute applications in linkage with each other. Each of the HMDs 100 includes the detector 220 that detects the predetermined linkage mark 810 and the execution section 230 that executes an application associated with the detected linkage mark 810 as a linkage application in linkage with other HMDs 100 that have detected the same linkage mark 810. Furthermore, each of the HMDs 100 according to the present embodiment includes the linkage section 240 that manages other HMDs 100 that have detected the same linkage mark 810 as member terminals (members) of a linkage group for executing the linkage applications in linkage.

According to the present embodiment, the users 900 recognize the same linkage mark 810, thereby realizing automatic identification of the linkage applications to be started as well as identification of the HMDs 100 to be linked. That is, according to the present embodiment, simply detecting the same linkage mark 810 in each of the HMDs 100 enables the HMDs 100 to form a linkage group and execute the same or equivalent linkage applications in linkage with each other. This allows, for example, the users 900 each wearing the information terminal such as the HMD 100 to form a group and experience such as chats, meetings, games, and the like easily and conveniently in the group.

The HMD 100 that has not detected the linkage mark 810 cannot be included in the linkage group. This prevents the linkage with the HMD 100 of the unintended user 900, and thus ensures safety.

Conventionally, the HMD 100 that is not a member of a linkage group at the time of initial setting and joins later causes necessity of reconstruction of the linkage group. Reconstruction of the linkage group requires additional operations such as adding a user who joins later to the group. However, according to the present embodiment, using the linkage group list enables management of the latest members, whereby a simple action of merely looking at the linkage mark 810 allows a user who wants to join later to join the linkage group. This can make the conventionally required operations unnecessary, and thus greatly improve the usability.

As described above, according to the present embodiment, it is possible to realize linkage of applications among a plurality of information processing terminals easily with good usability.

Note that, in the case of starting the linkage applications by the method according to the present embodiment, the HMD 100*s* to be linked may be limited to the ones which communicate to each other only in a local network having a limited connection area, such as a local area network (LAN), personal area network (PAN), or virtual private network (VPN) for safety.

<First Modification>

Note that, in the embodiment described above, each of the HMDs 100 starts the linkage application after identifying the linkage application, however, the present embodiment is not limited thereto. For example, by using the HMD 100 that detected the linkage mark 810 first as a main device, an instruction to start the linkage applications may be transmitted to other HMDs 100 from this HMD 100 serving as the main device. Upon receiving the instruction to start the linkage applications, the other HMDs 100 start the linkage applications.

In this case, for example, the HMD 100 that detected the linkage mark 810 earliest is used as the main device. In the case where the HMD 100 identified the linkage application and has not received any detection notification data 280*a*, the linkage section 240 thereof transmits the detection notification data to the surrounding HMDs 100 and sets a flag that the own device is the main device. Then, the linkage section 240 of the main device generates the linkage group list 260, and registers the detection notification data 280*a* in the linkage group list 260 upon each reception thereof from the surrounding HMDs 100 for a predetermined time. After the predetermined period of time has passed, the linkage section 240 outputs an instruction to start applications to the HMDs 100 registered in the linkage group list 260.

In the HMDs 100 other than the main device, when they have received the detection notification data 280*a* having the ID (A) which is the same mark as the mark ID (A) corresponding to the linkage mark 810 from the surrounding HMDs 100 after identification of the linkage mark 810, each linkage section 240 thereof generates the detection notification data 280*a* of the own device, and transmits it as a reply to the transmission source HMD 100 (main device). Thereafter, upon receiving an instruction to start an application, each execution section 230 of the HMDs 100 other than the main device starts and executes the linkage application.

In the case of setting a main device, the linkage group list 260 may be provided in each of all the HMDs 100 of the linkage group, or may be provided only in the main device. In the case where only the main device is provided with the linkage group list 260, the linkage processing is performed via the main device during execution of linkage applications.

Furthermore, the main device is not necessarily set to the HMD 100 that detected the linkage mark 810 earliest. For example, the main device may be predetermined to any device.

Furthermore, in the present modification, after transmitting the detection notification data 280*a*, the main device receives the detection notification data 280*a* as a reply from the HMD 100 that has detected the same linkage mark 810, however, the present embodiment is not limited thereto. For example, the main device may be configured to inquire all the HMDs 100 within a predetermined search area about whether they have recognized the linkage mark 810. The main device registers, in the linkage group list 260, the HMDs 100 which answered that they detected the linkage mark 810.

In this case, limiting the search range to a predetermined range enables the search time to be shortened. For example, it is limited to a range of LAN, PAN, or VPN, a range in which the HMDs 100 can communicate directly to each other by near field communication (Wi-fi, Bluetooth, etc.), a range of the HMDs 100 connected to the same access point, a range of the HMDs 100 whose number of hops of a network (the number of intermediate network devices through which data needs to pass between a transmission source and a transmission destination) is within a designated range, and the like. Furthermore, the search may be terminated at a designated time. Thus, the HMD 100 having a large number of hops is inevitably excluded from the search target, whereby the same object as described above can be achieved.

Second Embodiment

Next, a second embodiment of the present invention will be described. In the first embodiment, only the HMDs 100 are used to realize linkage. Furthermore, except for the modification, basically, each of the HMDs 100 manages a linkage group. On the other hand, in the present embodiment, a server serving as a second information processing terminal which is different from the HMDs 100 manages a linkage group to realize linkage. Hereinafter, the present embodiment will be described focusing on the features different from those of the first embodiment.

Figure 7:
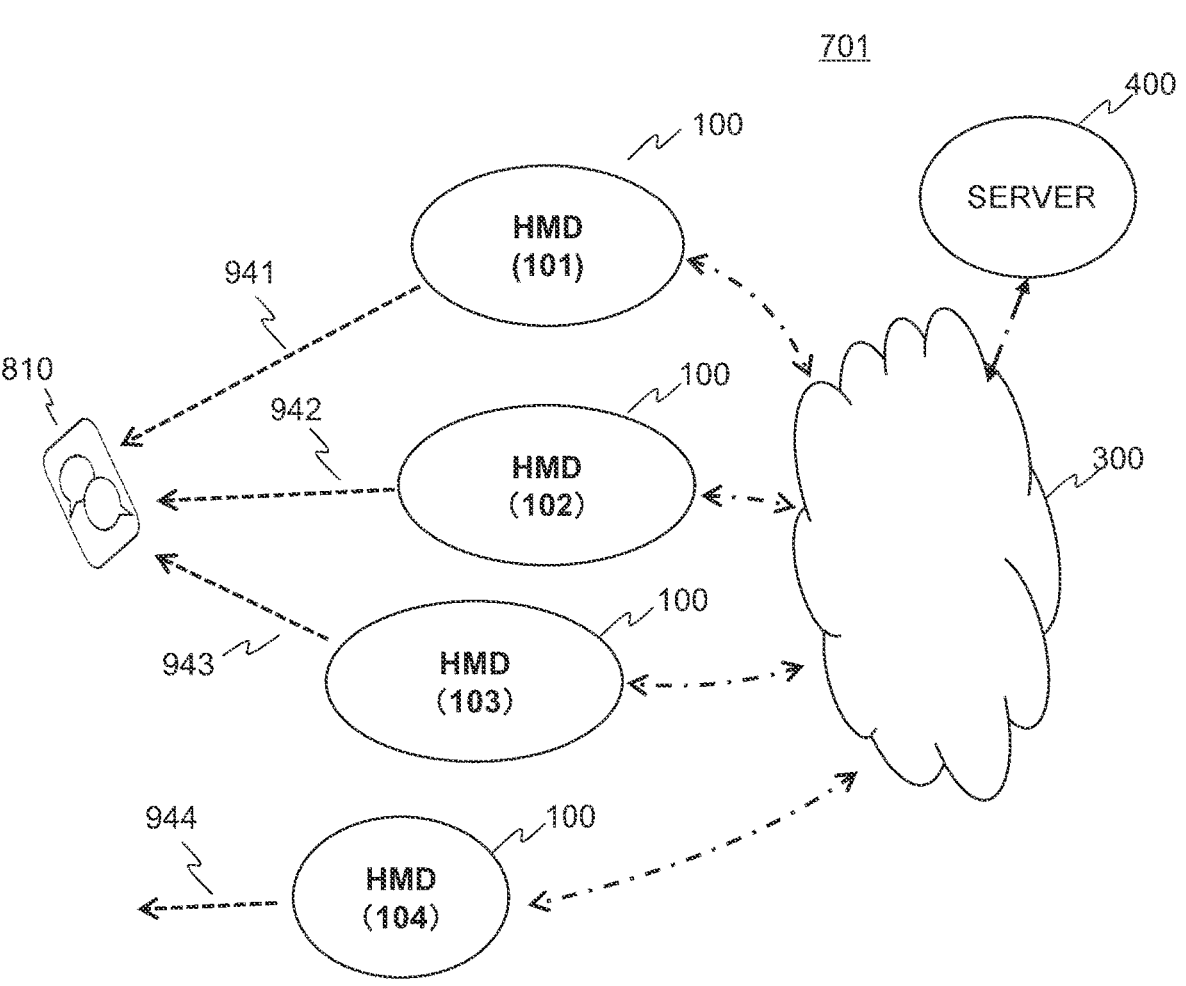
FIG. 7 is a configuration diagram of an information processing system according to a second embodiment.

As illustrated in FIG. 7, an information processing system 701 according to the present embodiment further includes a server 400 in addition to the configuration of the information processing system 700 according to the first embodiment. The plurality of HMDs 100 can transmit and receive data to and from each other by near field communication. In addition, the plurality of HMDs 100 can transmit and receive data to and from the server 400 via the network 300 such as LAN, respectively. The HMDs 100 are connected to the network 300 via, for example, wireless routers.

The hardware configuration of each of the HMDs 100 according to the present embodiment is the same as that of the first embodiment. The functional configuration of the HMD 100 according to the present embodiment is basically the same as that of the first embodiment. However, the configurations of the linkage section 240 and execution section 230 are different from those according to the first embodiment. Furthermore, the data stored in the memory and storage 110 is also different therefrom.

In the present embodiment, in the same manner as the first embodiment, when the linkage mark 810 is detected, the linkage section 240 transmits the detection notification data 280a to the server 400. Furthermore, when the linkage application is terminated, the linkage section 240 transmits the termination notification data 280b to the server 400. Note that, in the present embodiment, the detection notification data 280a may also include information on the present position of the HMD 100.

In the present embodiment, the server 400 manages a group of HMDs 100, in which the linkage applications are executed in linkage, as a linkage group.

The server 400 may be the one connected to each of the HMDs 100 by communication so as to transmit and receive necessary information, for example, a local server, a cloud server, an edge server, a network service, or the like, and the form thereof is not limited.

Figure 8A:
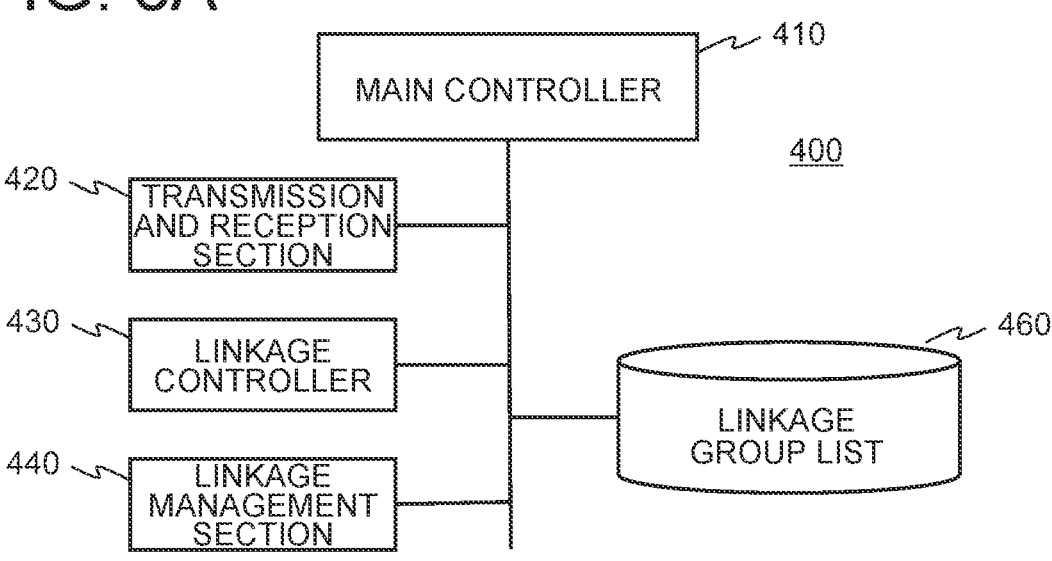
FIG. 8(*a*) is a functional block diagram of a server according to the second embodiment, FIG. 8(*b*) is a diagram for explaining an exemplary linkage group list according to the second embodiment, and FIG. 8(*c*) is a hardware configuration diagram of the server according to the second embodiment.

FIG. 8(a) is a block diagram of the functions related to the processing of the server 400 according to the present embodiment. As illustrated in FIG. 8(a), the server 400 includes a main controller 410, a transmission and reception section 420, a linkage controller 430, and a linkage management section 440. Furthermore, the server 400 manages a linkage group list 460.

The transmission and reception section 420 receives the notification data 280 from each of the HMDs 100.

The linkage management section 440 executes the linkage management processing of managing a group of HMDs 100, in which the same linkage applications are executed in linkage, as a linkage group. In the present embodiment, the linkage management section 440 generates the linkage group list 460 by a group of HMDs 100 each having detected the same linkage mark 810, and manage the linkage group using the generated linkage group list 460.

Figure 8B:
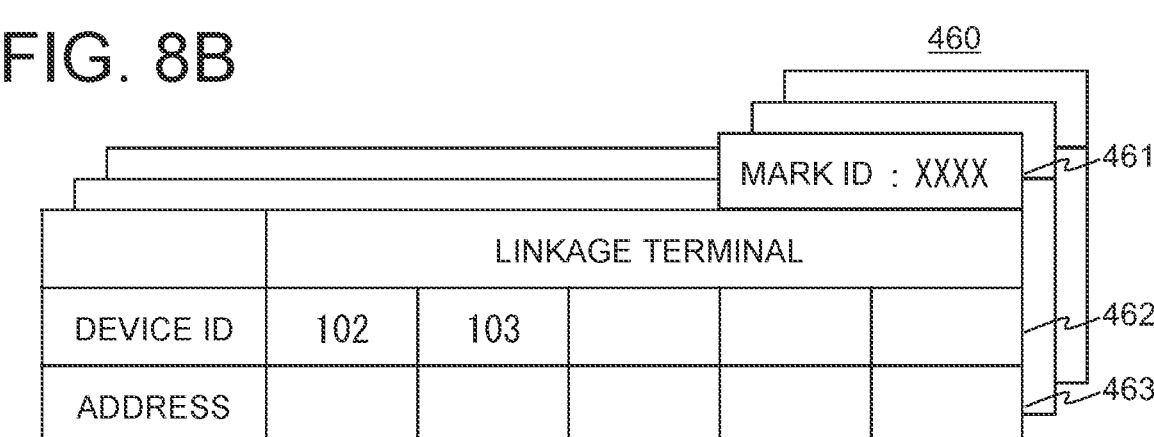

The linkage management section 440 generates the linkage group list 460 for each mark ID. The linkage group list 460 basically has the same configuration as the linkage group list 260 according to the first embodiment. That is, as illustrated in FIG. 8(b), the linkage group list 460 includes, for each mark ID identifying the linkage mark 810, a mark ID storage location 461 for retaining the mark ID, a device ID 462 and address 463 of the HMD 100 that executes the linkage application in linkage. In the present embodiment, upon receiving the latest linkage group list 460 from the server 400, the HMD 100 replaces the linkage group list 260 stored in the memory and storage 110 with the latest linkage group list 460.

In the case where the linkage application is executed via the server 400, the linkage controller 430 controls the execution of the linkage application among the plurality of HMDs 100. The linkage controller 430 controls the execution of the linkage application based on the linkage group list 460. For example, upon receiving data, the linkage controller 430 transmits the data to the HMDs 100, other than the transmission source HMD 100, in the linkage group including the device ID of the transmission source HMD 100. The linkage controller 430 is used in a modification which will be described later.

Figure 8C:
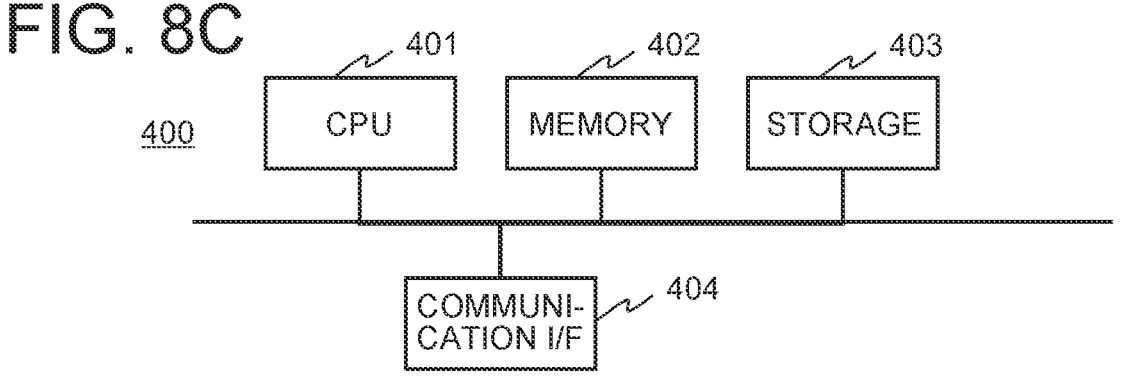

FIG. 8(c) is a hardware configuration diagram of the server 400. The server 400 according to the present embodiment includes a CPU 401, a memory 402, a storage 403, and a communication interface 404. The CPU 401 loads programs stored in the storage 403 into the memory 402 and executes them, whereby the functions described above are realized.

With the configuration described above, in the present embodiment as well, it is possible to form a linkage group with the plurality of HMDs 100 and execute shared applications in linkage by the linkage group.

[Linkage Processing]

Figure 9:
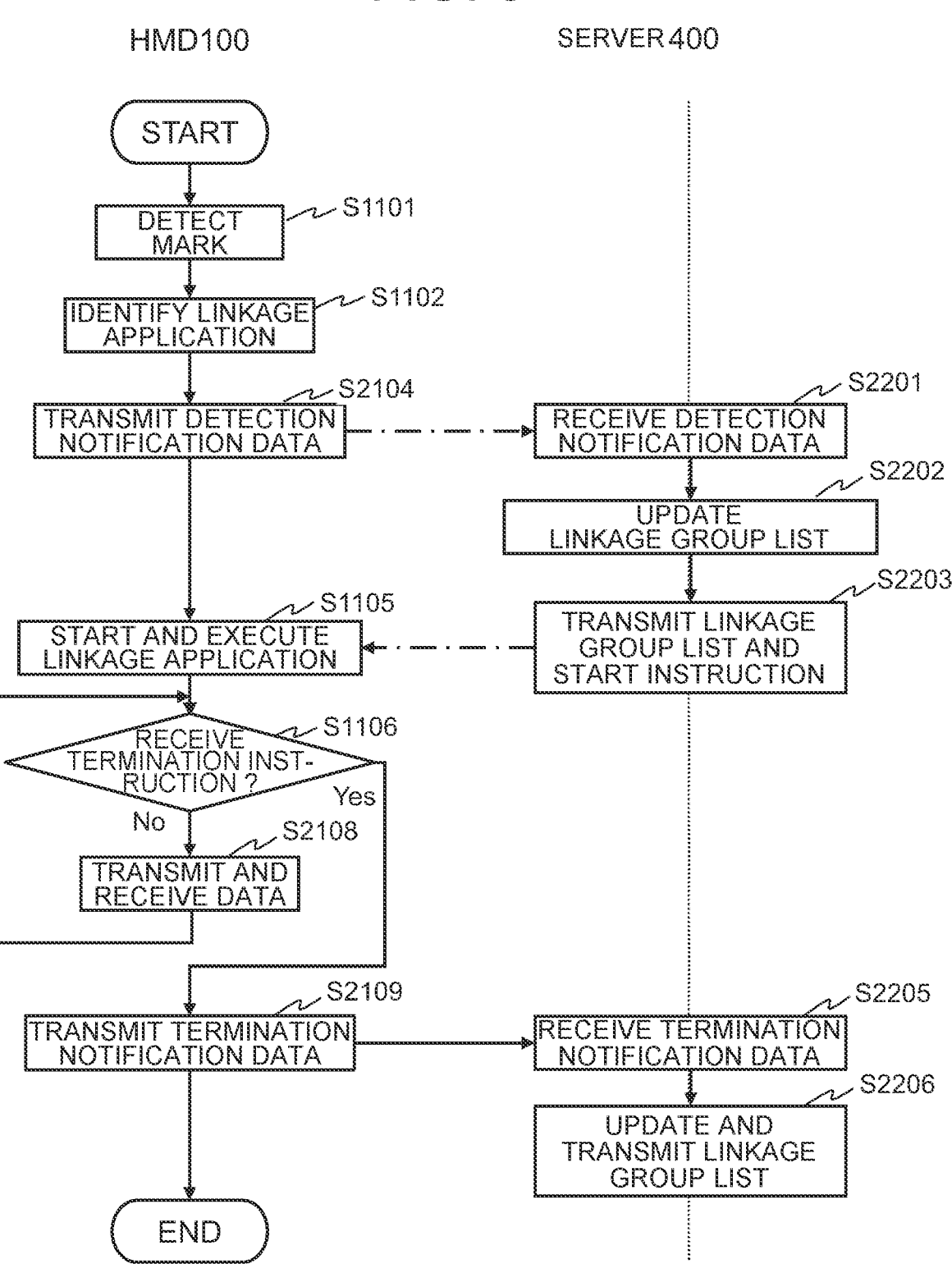
FIG. 9 illustrates a flowchart of the linkage processing according to the second embodiment.

Next, a flow of the processing at the time of linkage application execution (linkage application execution processing) according to the present embodiment will be described with reference to FIG. 9. Here, an example in which the server 400 transmits and receives data to and from the exemplary one HMD 100 will be described. The same applies to other HMDs 100.

Upon detecting the linkage mark 810 (step S1101), the detector 220 of the HMD 100 identifies the application registered in association with the detected linkage mark 810 as the linkage application (step S1102).

The linkage section 240 of the HMD 100 generates the detection notification data 280a and transmits it to the server 400 (step S2104).

Upon receiving the detection notification data 280a (step S2201), the linkage management section 440 of the server 400 stores the data about the transmission source HMD 100 in the linkage group list 460 to update the linkage group list 460 (step S2202). Here, the linkage management section 440 adds the device ID 282 and the address 283 to the linkage group list 460 in which the mark ID corresponding to the mark ID 281 in the detection notification data 280a is stored in the mark ID storage location 461. When the link group list 460 in which the mark ID corresponding to the mark ID 281 of the detection notification data 280a is stored in the mark ID storage location 461 is not present, the linkage management section 440 creates a new link group list to add the information therein.

Upon finishing the update, the linkage management section 440 returns, to the transmission source HMD 100, data indicating that the process of making it join the linkage group has been completed and instructing to start the application (start instruction) (step S2203). In addition, the linkage management section 440 transmits the linkage group list to all the HMDs 100 registered in the linkage group list.

Upon receiving the start instruction, the execution section 230 of the HMD 100 starts and executes the linkage application (step S1105). In the same manner as the first embodiment, the execution section 230 of the HMD 100 keeps executing the application until it receives an instruction to terminate it (step S1106).

During execution of the linkage application, in the present embodiment, the execution section 230 transmits and receives data necessary for linkage execution to and from other HMDs 100 registered in the linkage group list (step S2108).

Upon receiving the instruction to terminate the linkage application from the user 900, the execution section 230 of the HMD 100 terminates the linkage application, and the linkage section 240 generates the termination notification data 280b, transmits it to the server 400 (step S2109), and then ends the processing. Upon receiving the termination notification data 280b (step S2205), the linkage management section 440 of the server 400 deletes the transmission source HMD 100 from the linkage group list 460, thereby updating the linkage group list 460 (step S2206). Furthermore, the linkage management section 440 transmits the updated linkage group list 460 to each of the HMDs 100 registered in the updated linkage group list 460.

Similarly, upon detecting the linkage mark 810, each of other HMDs 100 transmits the detection notification data 280a to the server 400. Upon receiving the detection notification data 280a or the termination notification data 280b, the server 400 updates the linkage group list 460 at any time and returns the updated linkage group list 460 to each of the HMDs 100.

As described above, in the information processing system 701 according to the present embodiment, applications are executed in linkage by the HMDs 100 which is a plurality of information processing terminals. Each of the HMDs 100 includes the detector 220 that detects the predetermined linkage mark 810, and the execution section 230 that executes an application associated with the detected linkage mark 810 as a linkage application in linkage with another HMD 100 that has detected the same linkage mark 810. Furthermore, the information processing system 701 according to the present embodiment further includes the server 400 including the linkage management section 440 that manages a plurality of HMDs 100 having detected the same linkage mark 810 as members of a linkage group for executing the linkage applications in linkage. The linkage management section 440 transmits data obtained by the linkage management processing to another HMD 100 and also receives data obtained by the linkage management processing from the other HMD 100. The execution section 230 of the HMD 100 transmits the data obtained by the processing of the linkage application to another HMD 100 and receives data obtained by the processing of the linkage application from the other HMD 100.

According to the present embodiment, in the same manner as the first embodiment, it is possible to realize linkage of applications easily and safely with good usability. Furthermore, according to the present embodiment, the server 400 manages the HMDs 100 that are linked with each other. The placement of the HMDs is not limited as long as the HMDs 100 can at least detect the same linkage mark 810 and communicate with the server 400, thereby realizing a more flexible system.

<Second Modification>

The HMD 100 according to the present embodiment starts a linkage application upon receiving the start instruction from the server 400. However, the present embodiment is not limited thereto. For example, in the same manner as the first embodiment, the HMD 100 may start a linkage application independently upon identifying the linkage application. In this case, the server 400 does not have to transmit the start instruction.

<Third Modification>

For example, in the case where a plurality of HMDs 100, at substantially the same time, visually recognizes the linkage mark 810 and forms a linkage group to execute the linkage applications, the server 400 may simultaneously transmit start instructions to them. In this case, the server 400 transmits data allowing participation to the plurality of HMDs 100 each of which transmitted the detection notification data 280a including the same mark ID 281 at the same time within a predetermined period.

<Fourth Modification>

In the present embodiment, the server 400 manages a group of the HMDs 100 that have detected the linkage mark 810 as members of a linkage group. However, the management of the linkage group is not limited thereto.

For example, even a group of the HMDs 100 each having detected the same linkage mark 810 may be divided into a plurality of linkage groups and managed. In this case, for example, the server 400 may divide the HMDs 100 by the time at which they transmitted the detection notification data 280a. Alternatively, the server 400 may divide the HMDs 100 using the position information thereon.

In the case of dividing by time, for example, as described above, when receiving the pieces of the detection notification data 280a including the same mark ID 281 continuously within a predetermined time, the linkage management section 440 sets the HMDs 100 that transmitted these pieces of detection notification data 280a as one linkage group. Then, the linkage management section 440 sets, as another linkage group, a group of the HMDs 100 each transmitted the detection notification data 280a including the same mark ID 281 after the predetermined period has passed.

Figure 10:
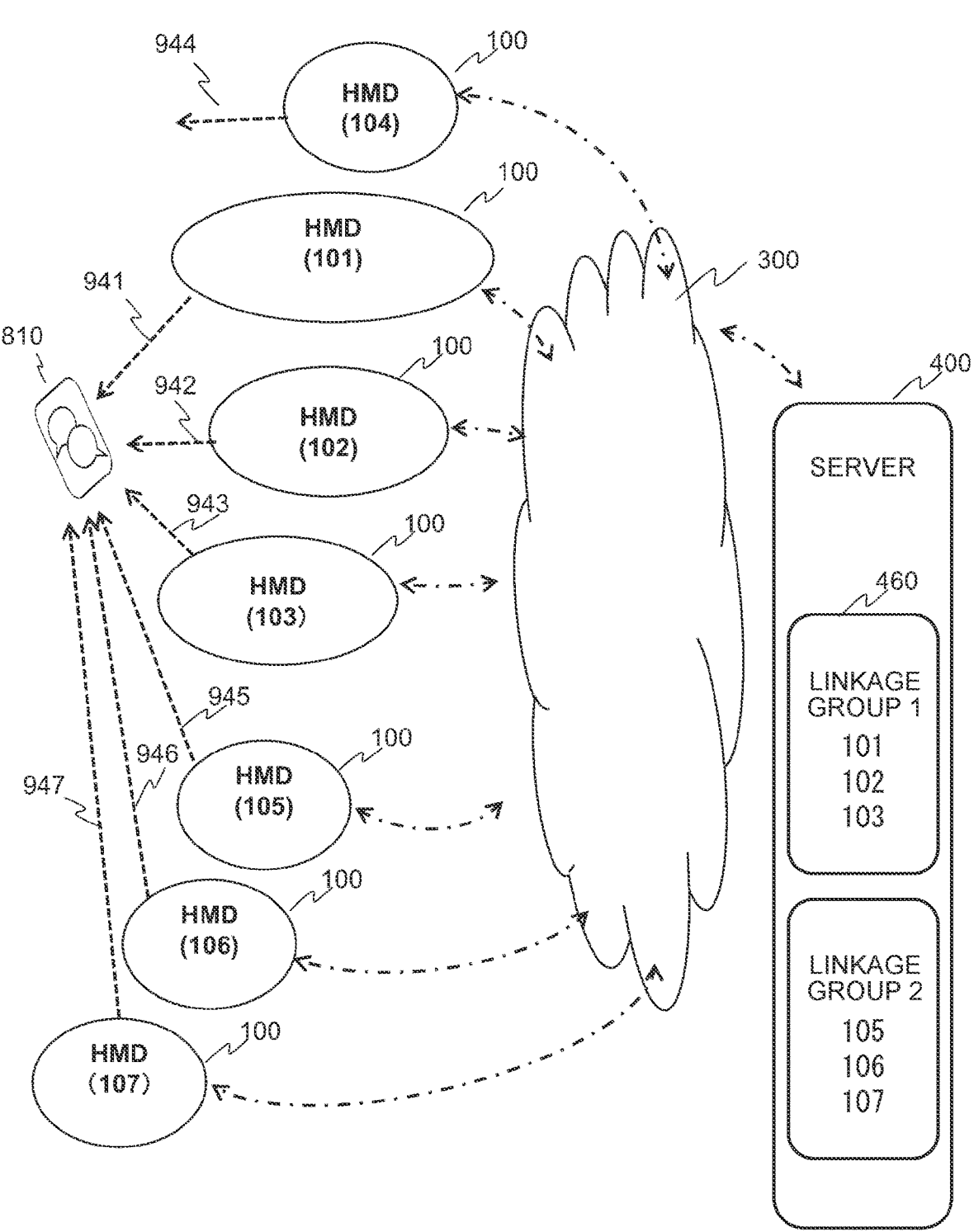
FIG. 10 is a system configuration diagram of a modification according to the second embodiment.

For example, as illustrated in FIG. 10, in the case where users of the HMDs 100 look at the same linkage mark 810 and they start chatting for each group at different timings, respectively, the linkage management section 440 divides the HMDs 100 into groups based on the timing of starting chatting. Then, the linkage management section 440 generates and manages the linkage group list 460 for each group. Here, the linkage management section 440 creates and manages the linkage group list 460 of the linkage group 1 and the linkage group list 460 of the linkage group 2. In this case as well, the HMD 104 whose user 900 has not recognized the linkage mark 810, in other words, the HMD 104 that has not detected the linkage mark 810 is not included any of the groups.

In the case of dividing by the position information on the HMDs 100, the linkage management section 440 divides the HMDs 100 into groups using the position information transmitted from the HMDs 100. The boundary used for the grouping is determined in advance.

<Fifth Modification>

In the embodiment described above, the linkage applications are executed among the HMDs 100 of the linkage group. However, the present embodiment is not limited thereto. For example, the linkage application may be executed via the server 400. In this case, the linkage controller 430 controls execution of the linkage application. Furthermore, the transmission and reception section 420 mediates transmission and reception of data among the HMDs 100 during linkage execution of a linkage application by the plurality of HMDs 100.

In this case, only the server 400 may manage the linkage group list 460. That is, the linkage management section 440 may not transmit the linkage group list 460 to each of the HMDs 100 in step S2203 or step S2206.

During execution of the linkage application, the execution section 230 of each of the HMDs 100 transmits data necessary for linkage execution of the application to the server 400. In the server 400, when referring to the linkage group list 460 and receiving the data from each of the HMDs 100 of the linkage group, the linkage controller 430 performs the processing and transmits the data to the other HMDs 100 of the linkage group.

Note that the server 400 may retain applications, files, and data and transfer them to each of the HMDs 100 by communication as appropriate. The server 400 may start an application on the server 400 per se and transmit playing data such as video, screen display, and audio information to the HMDs 100 which are members of the linkage group.

Third Embodiment

Next, a third embodiment of the present invention will be described. In the present embodiment, a linkage mark to be recognized is displayed on a display of an information processing terminal such as a smartphone. Hereinafter, the present embodiment will be described referring to an example in which this information processing terminal is a smartphone.

Figure 11:
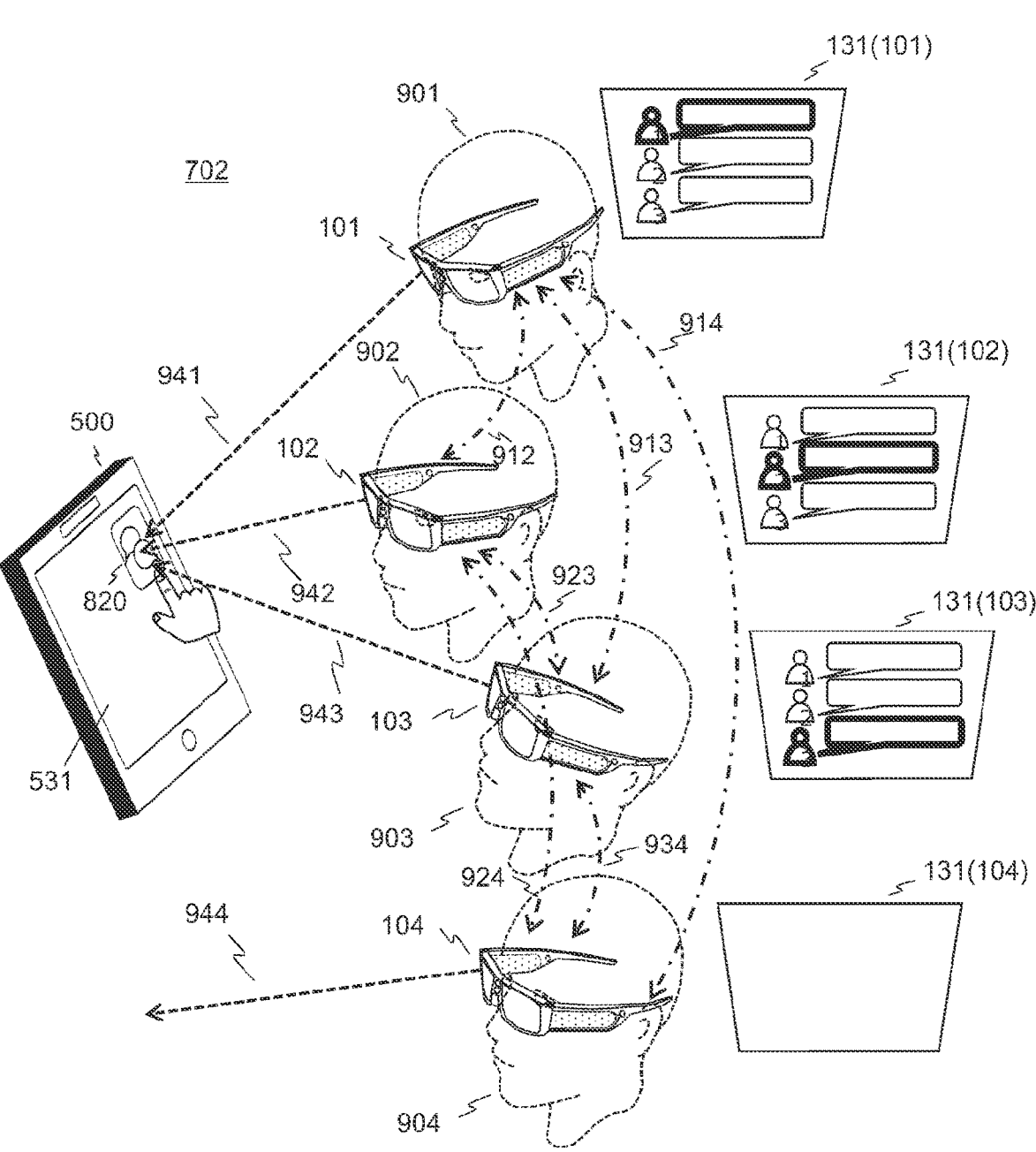
FIG. 11 is a diagram for explaining a system configuration according to a third embodiment.

FIG. 11 is a diagram for explaining an outline of an information processing system 702 according to the present embodiment. As illustrated in FIG. 11, the information processing system 702 according to the present embodiment includes the plurality of HMDs 100 (101, 102, 103, 104) and a smartphone 500.

In the present embodiment, each of the HMDs 100 determines whether they are in linkage with the smartphone 500. The smartphone 500 manages a group of the HMDs 100 which are in linkage with the own terminal as members of the linkage group.

The information processing system 702 according to the present embodiment includes the plurality of HMDs 100 (101, 102, 103, 104) and the smartphone 500. In the present embodiment, a linkage mark 820 is displayed on a display 531 of the smartphone 500.

The HMDs 100 according to the present embodiment are basically configured the same as those of the first embodiment. However, the processing by the detector 220 and linkage section 240 and data held thereby are different from those of the first embodiment.

First, the detector 220 of each of the HMDs 100 according to the present embodiment determines whether the smartphone 500 and the own terminal are in a predetermined positional relation. That is, the detector 220 determines whether a predetermined placement state in which the smartphone 500 is operable in a linkage operation mode, which will be described later, is satisfied. In the present embodiment, as illustrated in FIG. 12(*a*), the detector 220 causes the display 131 to display the linkage visual field 131*a*, analyzes the captured image captured by the out-camera 133, and determines whether the predetermined placement state is satisfied based on the displayed content.

The linkage visual field 131*a* is set in a portion of an area within the field of view which can be viewed by the user 900 through an aperture (lens portion) of the HMD 100 or the display area of the display 131. Note that the linkage visual field 131*a* can be set to the entire range of the field of view which can be viewed by the user 900 through the HMD 100 based on change in the configuration of the device, setting values, or the like.

Figure 12A:
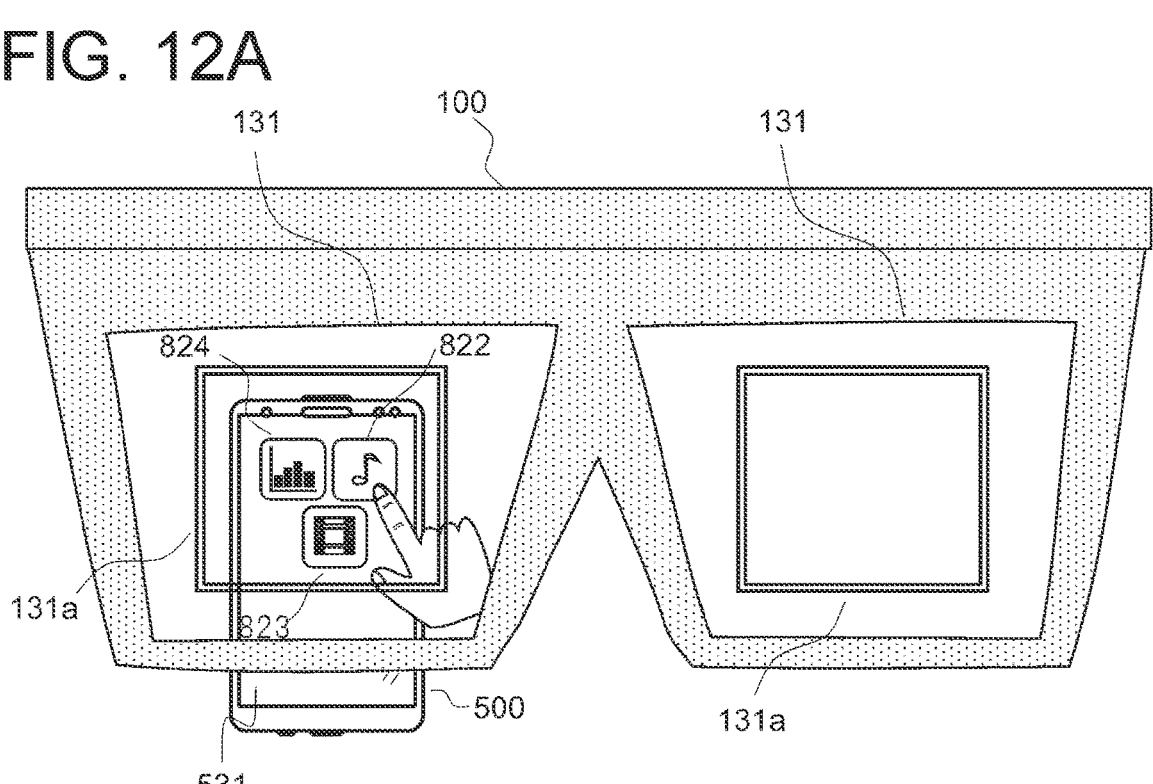
FIG. 12(*a*) and FIG. 12(*b*) are diagrams for explaining detection of a linkage mark by a detector according to the third embodiment.
Figure 12B:
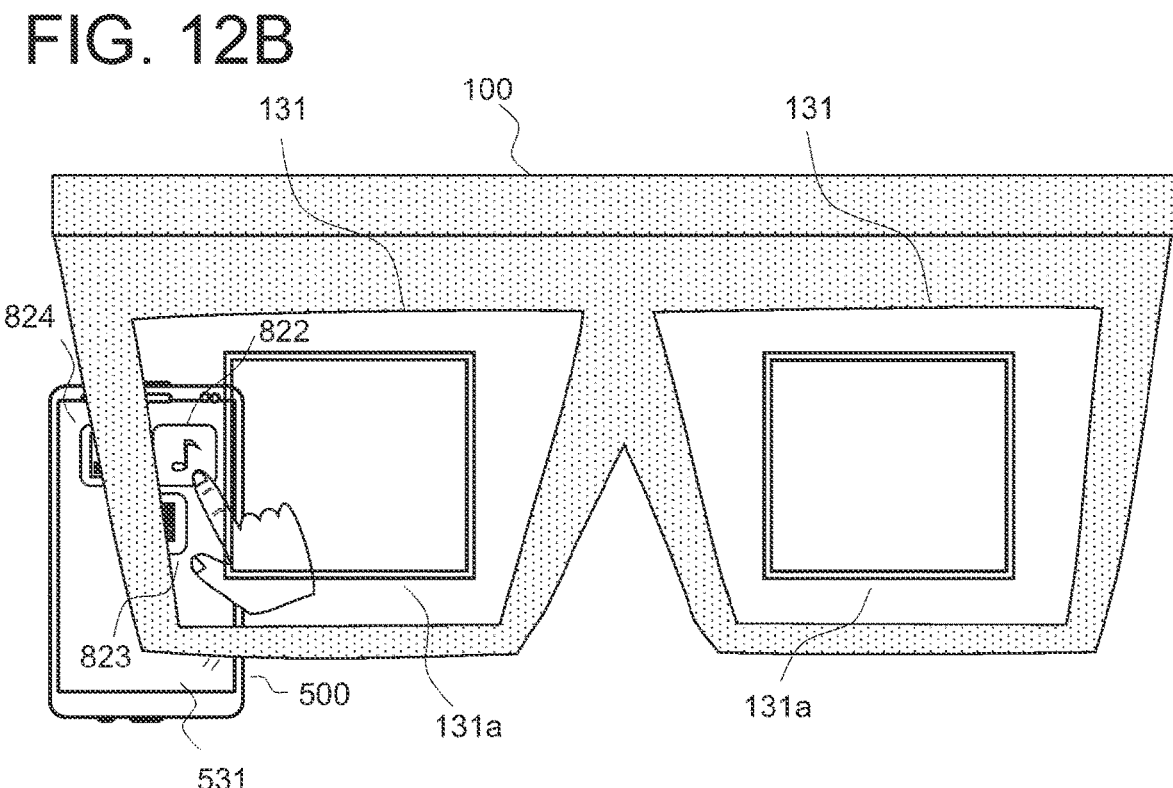

As illustrated in FIG. 12(*a*), the detector 220 determines that the predetermine placement state is satisfied when an icon 822 of a predetermined application displayed on the display 531 of the smartphone 500 is included within the linkage visual field 131*a*. In many cases, as illustrated in FIG. 12(*a*), a plurality of icons 822, 823, 824 are displayed on the display 531 of the smartphone 500. The predetermined icon is, for example, an icon of an application selected by the user 900.

The detector 220 analyzes the captured image 136 to determine whether the icon 822 of the application selected by the user 900 is included within the linkage visual field 131*a*. For example, the detector 220 determines a state in which the user 900 is pointing a finger and the position thereof by the image analysis processing.

When determining that the predetermined placement state is satisfied, the detector 220 detects the icon 822 of the predetermined application as the linkage mark 820. Then, the detector 220 identifies the application registered in the application list 250 in association with the detected linkage mark 820 as the linkage application. In the case where the application is not registered in the application list 250, in the same manner as the first embodiment, the detector 220 may acquire the application from an external device such as a server and register it in the application list 250.

In the present embodiment, the shape data of an icon of an application installed in the own device may be stored in the application list 250 as the shape data 253 of the mark data 252.

As illustrated in FIG. 12(*b*), in the case where the predetermined icon 822 displayed on the display 531 of the smartphone 500 is not included within the linkage visual field 131*a*, that is, when determining that the HMD 100 and the smartphone 500 are not in the predetermined placement state, the detector 220 does not perform the subsequent detection processes.

When the linkage mark 820 is detected, the linkage section 240 generates the detection notification data 280*a* and transmits it to the smartphone 500.

Upon receiving a start instruction from the smartphone 500, the execution section 230 starts and executes the linkage application. In the present embodiment as well, the HMD 100 may start the linkage application upon identifying the linkage application without receiving the start instruction from the smartphone 500.

Next, the smartphone 500 according to the present embodiment will be described.

Figure 13:
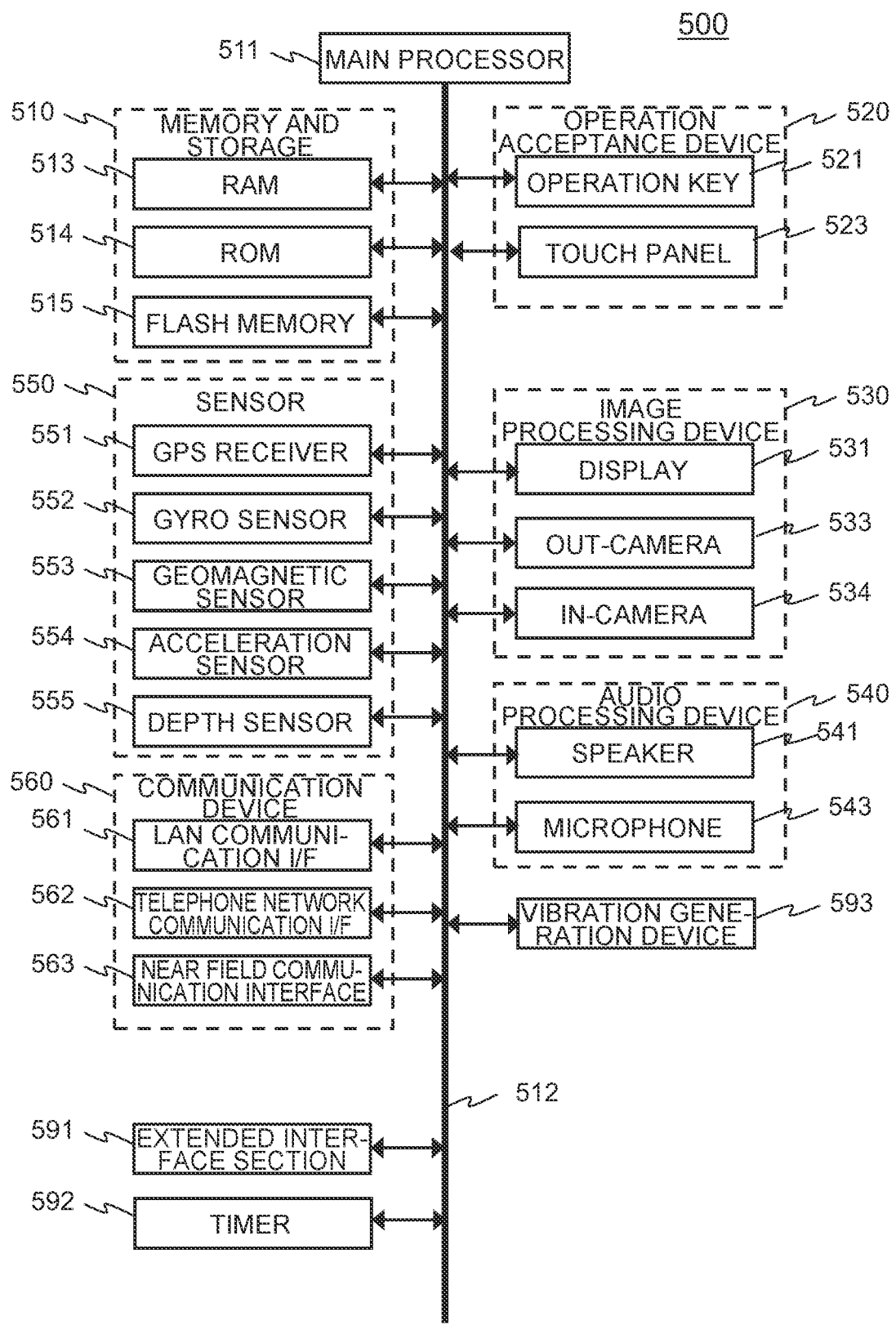
FIG. 13 is a hardware configuration diagram of a smartphone according to the third embodiment.

FIG. 13 is a hardware configuration diagram of the smartphone 500. As illustrated in FIG. 13, the smartphone 500 includes a main processor 511, a memory and storage 510, an operation acceptance device 520, an image processing device 530, an audio processing device 540, a sensor 550, a communication device 560, an extended interface section 591, a timer 592, a vibration generation device 593, and an internal bus 512 connecting these components. The memory and storage 510 includes a RAM 513, a ROM 514, and a flash memory 515. The operation acceptance device 520 includes an operation key 521. The image processing device 530 includes the display 531, an out-camera 533, and an in-camera 534. The audio processing device 540 includes a speaker 541 and a microphone 543. The sensor 550 includes a GPS receiver 551, a gyro sensor 552, a geomagnetic sensor 553, an acceleration sensor 554, and a depth sensor 555. The communication device 560 includes a LAN communication interface 561, a telephone network communication interface 562, and a near field communication interface 563. These components have the same functions as those of the components of the HMD 100 which have the same names.

The display 531 of the smartphone 500 has a larger area than that of the HMD 100. Thus, the operation acceptance device 520 further includes a touch panel 523 including a touch sensor. For example, a touch pad type input means employing, for example, a static capacitance sensor may be provided. Such an input means detects the approach or touch operation by a finger, a touch pen, or the like as an operation input. Using the touch pad enables the user 900 to input and set his or her desired information and also easily select and designate an icon of an application or a file on the display 531 by a touch operation. The touch panel 523 is arranged to be superimposed on the display 531. Inputting of an instruction may be accepted via, for example, a keyboard connected to the extended interface section 591.

The display 531 is formed with, for example, a liquid crystal panel, and displays the notification information to the user 900 such as information about the remaining battery capacity, various alarms, and time, and also displays an icon of an application to be started and an execution status of the application. The operation acceptance device 520 is, for example, a touch pad type input means employing, for example, a static capacitance sensor, and detects the approach or touch operation by a finger, a touch pen, or the like as an operation input. Using the touch pad enables the user 900 to input and set his or her desired information and also easily select and designate an icon of an application or a file on the display 531 by a touch operation.

The smartphone 500 according to the present embodiment displays an icon for accepting an instruction to start an application on the display 531. This icon is a mark for accepting designation of an application and an instruction to start the application by means of an approaching or touch operation (hereinafter, referred to as touch) using a finger of the user 900, a touch pen, or the like.

Figure 14A:
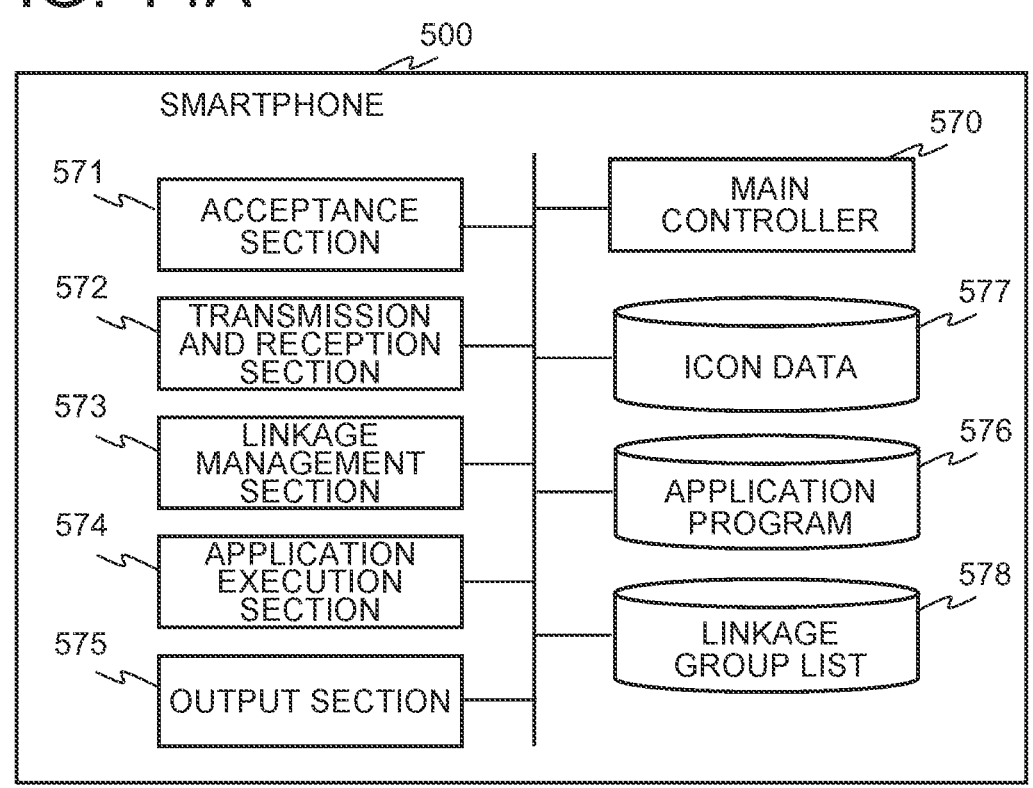
FIG. 14(*a*) is a functional block diagram of the smartphone according to the third embodiment, and FIG. 14(*b*) is a diagram for explaining an exemplary icon display of a modification according to the third embodiment.
Figure 14B:
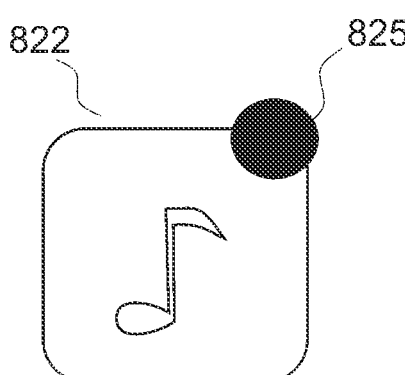

Next, the functions of the smartphone 500 according to the present embodiment will be described. FIG. 14(*a*) illustrates functional blocks of the smartphone 500.

As illustrated in FIG. 14(*a*), the smartphone 500 according to the present embodiment includes a main controller 570, an acceptance section 571, a transmission and reception section 572, a linkage management section 573, an application execution section 574, an output section 575, an icon data storage 577, an application program storage 576, and a linkage group list 578.

The main controller 570 controls the operations of each section of the smartphone 500. In the present embodiment, the main controller 570 is further configured to decide an operation mode of the smartphone 500. In the present embodiment, the operation mode of the smartphone 500 includes two types, namely, an independent operation mode for executing an application independently by the smartphone 500, and a linkage operation mode for executing an application in linkage with the HMD 100.

Upon receiving the detection notification data 280*a* from, for example, the HMD 100 with which the smartphone 500 has established the linkage, the main controller 570 decides the linkage operation mode as the operation mode.

The acceptance section 571 accepts an instruction from the user 900. In the present embodiment, the main processor 511 causes the operation acceptance device 520 to operate, whereby the acceptance section 571 can realize the function above. In the present embodiment, the acceptance section 571 accepts various kinds of operation instructions such as an instruction to start an application.

The transmission and reception section 572 transmits and receives data to and from an external device. In the present embodiment, the main processor 511 causes the communication device 560 to operate, whereby the transmission and reception section 572 can realize the functions above. In the present embodiment, data is transmitted and received between the smartphone 500 and the HMD 100 via the transmission and reception section 572.

The linkage management section 573 performs linkage operations in the case where the linkage operation mode is decided as an operation mode of the smartphone 500. The linkage management section 573 registers, in the linkage group list 578, the mark ID 281, device ID 282, and address 283 of the received detection notification data 280*a*. Upon receiving the termination notification data 280*b* from the HMD 100 registered in the linkage group list 578, the linkage management section 573 deletes the data on the corresponding device. Thus, the linkage management section 573 manages the linkage group. The configuration of the linkage group list 578 is the same as that of the linkage group list 260 according to the first embodiment.

Furthermore, the linkage management section 573 controls the linkage operations of the linkage application by each HMD 100 which is a member of a linkage group. For example, the linkage management section 573 displays, on the application icon of the application being used, a mark indicating that the application is being used, the number of participants, and which application is currently active in an easy-to-understand manner. This enables a user who joins later to check an application with other participants by referring to such a display, and then select and join the application.

In the independent operation mode, the application execution section 574 executes an application on the smartphone 500. The independent operation mode is an operation mode for allowing the application execution section 574 to start and execute an application on the own device upon receiving an instruction to start the application from the user 900. A program of an application to be executed is stored in the application program storage 576.

The output section 575 outputs a result of execution of an application executed by the application execution section 574. In the present embodiment, the output section 575 outputs the execution result to, for example, the display 531 and the speaker 541.

The application program storage 576 retains application programs. The icon data storage 577 retains icons for accepting instructions to execute the application program. Each of the icons is stored in association with the corresponding application.

The main processor 511 loads programs stored in the ROM 514 into the RAM 513 and executes them, whereby the functions described above are realized. The application program storage 576 and the icon data storage 577 are stored in the memory and storage 510.

[Linkage Processing]

Figure 15:
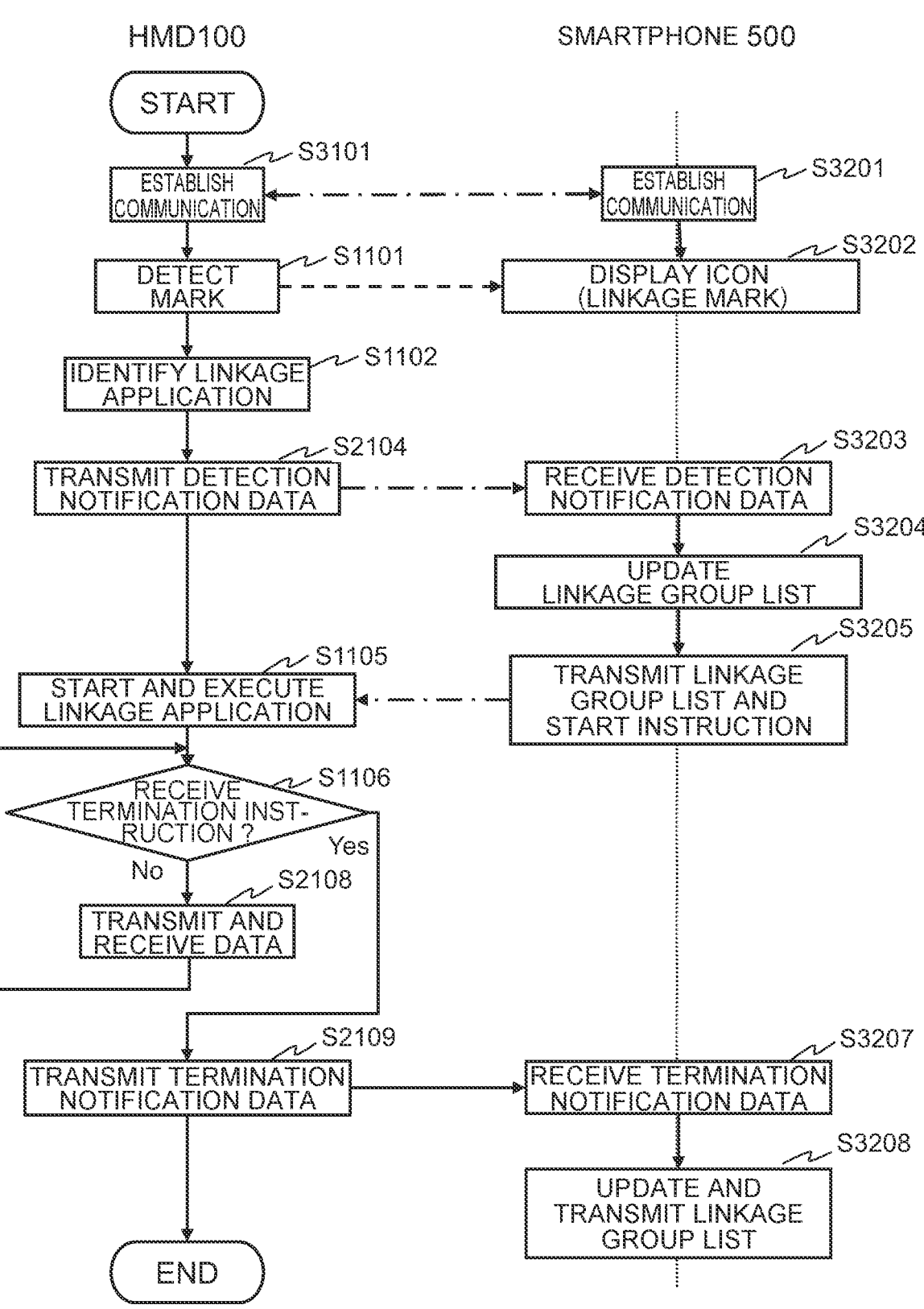
FIG. 15 illustrates a flowchart of the linkage processing according to the third embodiment.

A flow of the linkage processing according to the present embodiment will be described with reference to FIG. 15.

Firstly, communication is established between the HMD 100 and the smartphone 500 (step S3101, step S3201). Here, communication settings are made between the smartphone 500 and a plurality of HMDs 100 so that communication is available among them. For example, when each of the HMDs 100 enters a communication range of the smartphone 500, communication is automatically or manually established among both of them.

Thereafter, the smartphone 500 displays the icon 822 (step S3202). Here, a normal screen on which many icons are displayed is displayed. As described above, the user 900 selects and designates the icon 822 to be used as the linkage mark 820.

The subsequent processes are substantially the same as those of the linkage processing with the server 400 according to the second embodiment. That is, upon detecting the linkage mark 820 (step S1101), the detector 220 of each of the HMDs 100 identifies the application registered in association with the detected linkage mark 820 as the linkage application (step S1102).

The linkage section 240 of each of the HMDs 100 generates the detection notification data 280a and transmits it to the smartphone 500 (step S2104).

Upon receiving the detection notification data 280a (step S3203), the linkage management section 573 of the smartphone 500 stores the data on the transmission source HMD 100 in the linkage group list 578 (step S3204) to update the linkage group list 578.

Upon finishing the update, the linkage management section 573 returns, to the transmission source HMD 100, data indicating that the process of making it join the linkage group has been completed and instructing to start the application (start instruction) (step S3205). In addition, the linkage management section 573 transmits the linkage group list to all the HMDs 100 registered in the linkage group list 578.

Upon receiving the start instruction, the execution section 230 of the HMD 100 starts and executes the linkage application (step S1105). In the same manner as the first embodiment, the execution section 230 of the HMD 100 keeps executing the application until it receives an instruction to terminate it (step S1106).

During execution of the linkage application, in the present embodiment, the execution section 230 transmits and receives data necessary for linkage execution to and from other HMDs 100 registered in the linkage group list 578 (step S2108).

Upon receiving the instruction to terminate the linkage application from the user 900, the execution section 230 of the HMD 100 terminates the linkage application, and the linkage section 240 generates the termination notification data 280b and transmits it to the smartphone 500 (step S2109), whereby the processing is ended. Upon receiving the termination notification data 280b (step S3207), the linkage management section 573 of the smartphone 500 deletes the transmission source HMD 100 from the linkage group list 578, thereby updating the linkage group list 578 (step S3208). Furthermore, the linkage management section 573 transmits the updated linkage group list 578 to each of the HMDs 100 registered in the updated linkage group list 578.

Similarly, upon detecting the linkage mark 810, each of other HMDs 100 transmits the detection notification data 280a to the smartphone 500. Upon receiving the detection notification data 280a or the termination notification data 280b, the smartphone 500 updates the linkage group list 578 at any time and returns the updated linkage group list 578 to each of the HMDs 100.

Note that, in the present embodiment, a time difference between determination as to whether the predetermined placement state is satisfied and a touch operation on the icon 822 by the user 900 may cause the event, during the time difference, that the HMD 100 whose user is not looking at the icon 822 joins the linkage group, or the event that the HMD 100 whose user is looking at the icon 822 cannot join the linkage group. In order to avoid the time difference between both of them, an interval for storing (interval for updating the linkage group list 578) may be shortened.

Furthermore, the icon touch operation may be recognized using the out-camera 133 of the HMD 100. In this case, since determination of the time at the moment of touching may vary depending on the viewing angle, a period of time for determining the icon touch operation may be allowed to have sufficient time.

As described above, in the information processing system 702 according to the present embodiment, applications are executed in linkage by the HMDs 100 which is a plurality of information processing terminals. Each of the HMDs 100 includes the detector 220 that detects the predetermined linkage mark 820 displayed on the display 531 of the smartphone 500, and the execution section 230 that executes an application associated with the detected linkage mark 820 as a linkage application in linkage with another HMD 100 that has detected the same linkage mark 820. Furthermore, the information processing system 702 according to the present embodiment further includes the smartphone 500 including the linkage management section 573 that manages a plurality of HMDs 100 having detected the same linkage mark 820 as members of a linkage group for executing the linkage applications in linkage. The linkage management section 230 transmits data obtained by the linkage management processing to another HMD 100 and also receives data obtained by the linkage management processing from the other HMD 100.

According to the present embodiment, in the same manner as the first embodiment, it is possible to realize linkage of applications easily and safely with good usability. Furthermore, according to the present embodiment, the linkage mark 820 is displayed on the display 531 of the smartphone 500. When the HMD 100 and the smartphone 500 are in the predetermined placement state such that the icon 822 displayed on the display 531 of the smartphone 500 is included within the linkage visual field 131a of the HMD 100, the HMDs 100 in the same placement state with respect to the smartphone 500 can form a linkage group and execute the linkage applications in linkage with each other. Therefore, according to the present embodiment, it is possible to identify linkage applications and the HMDs 100 to be linked easily with good usability.

Furthermore, according to the present embodiment, since the linkage mark 820 is displayed on the display 531 of the smartphone 500, unlike the linkage mark which is physically printed and cannot be easily changed, a large number of linkage marks can be displayed while being replaced by scrolling or the like within a limited area. This increases the number and options of linkage marks that can be used. Furthermore, since the arrangement position of the linkage mark 820 can be moved, the user 900 of the HMD 100 can recognize the linkage mark 820 at an easy to see position, and thus can easily visually recognize the linkage mark 820. That is, this enables the HMD 100 to easily detect the linkage mark 820.

In addition, the smartphone 500 can distinguish an operation mode between the linkage operation mode and the independent operation mode. Thus, upon receiving the selection of the icon 822 displayed on the display 531 from the user 900, the smartphone 500 can automatically determine whether to cause the corresponding application to operate on the own device or control the linkage operations thereof.

<Sixth Modification>

In the embodiment described above, the icon 822 of the smartphone 500 is viewed through the visual fields of the plurality of HMDs 100. Thus, in the case where a plurality of icons is displayed on the display 531 of the smartphone

500, the users 900 have to keep selecting the icon 822 until the HMD 100 desired to be linked has detected the linkage mark 820. However, the present embodiment is not limited to this approach.

For example, when having received the detection notification data 280a firstly and generated the linkage group list 578, the smartphone 500 may display only the icon 822 selected by the user 900 on the display 531. Thereafter, the icon 822 functions as the linkage mark 820 without a selection instruction from the user 900.

Thus, the specific icon 822 is kept displayed on the display 531 as the linkage mark 820 for a predetermined period of time, and this allows the HMD 100 whose user wants to participate in the linkage group to easily join. In this configuration as well, a simple action of not viewing the display of the smartphone 500 prevents the user 900 who does not want to join the linkage group from being included therein.

<Seventh Modification>

In the embodiment described above, every time the smartphone 500 receives the detection notification data 280a and registers the transmission source HMD 100 in the linkage group list 578, it transmits an instruction to start an application to that HMD 100. However, the present embodiment is not limited thereto. For example, the smartphone 500 may simultaneously transmit instructions to start applications to the HMDs 100 that transmitted the detection notification data 280a.

In this case, for example, each time the linkage management section 573 receives the detection notification data 280a, it registers the transmission source HMD 100 in the linkage group list 578. Thereafter, when receiving an instruction to start an application by means of a touch operation on the icon 822 identified as the linkage mark 820, the linkage management section 573 transmits instructions to start applications to all the HMDs 100 registered in linkage group list 578. Upon receiving the instructions from the smartphone 500, the HMDs 100 start the linkage applications in response thereto, respectively.

<Eighth Modification>

In the present embodiment, in the same manner as the modification according to the second embodiment, the smartphone 500 may control execution of the linkage application. In this case, the linkage management section 573 transmits the data received from each of the HMDs 100 executing the linkage application to other HMDs 100.

In this case, only the smartphone 500 may manage the linkage group list 578. That is, the linkage management section 573 may not transmit the linkage group list 578 to the HMDs 100 in step S3205 or step S3208.

During execution of the linkage application, the execution section 230 of each of the HMDs 100 transmits data necessary for linkage execution of the application to the smartphone 500. In the smartphone 500, when referring to the linkage group list 578 and receiving the data from each of the HMDs 100 in the linkage group, the linkage management section 573 performs the processing and transmits the data to the other HMDs 100 in the linkage group.

<Ninth Modification>

The smartphone 500 may not only mediate data of a linkage application but also execute the linkage application by itself. In this case, the smartphone 500 registers the device ID and address of the own device in the linkage group list 578. Then, the application execution section 574 executes the linkage application even in the linkage operation mode.

<Tenth Modification>

In the embodiment described above, whether the predetermined placement is satisfied is determined using an image captured by the out-camera 133 of the HMD 100. However, the present embodiment is not limited thereto. For example, whether the smartphone 500 and the HMD 100 are in the predetermined placement state may be determined using the information from the sensor 550 of the smartphone 500.

For example, using the acceleration sensor 154, gyro sensor 152, and geomagnetic sensor 153 to detect the position and orientation of the HMD 100 enables determination as to whether the predetermined placement is satisfied based on the attitude of the HMD 100 and the attitude and position of the smartphone 500. The attitude and position of the smartphone 500 can be calculated using the acceleration sensor 554, gyro sensor 552, and geomagnetic sensor 553 included in the smartphone 500. The distance between the smartphone 500 and the HMD 100 is acquired using the depth sensor 155 or the like.

<Eleventh Modification>

In the embodiment described above, it is determined that the predetermined placement state is satisfied in the case where the icon 822 displayed on the display 531 of the smartphone 500 and to be selected by the user 900 is present in the predetermined linkage visual field 131a, and then the icon 822 is used as the linkage mark 820. However, the present embodiment is not limited thereto. For example, the icon 822 desired to be the linkage mark 820 may be selected through the HMD 100 from a plurality of icons displayed on the display 531 of the smartphone 500.

<Twelfth Modification>

The linkage mark 820 displayed on the display 531 of the smartphone 500 may not be the icon 822 of the linkage application. For example, it may be an icon indicating file data. In this case, an application for playing the file data is stored in advance in association with the mark data as the application list 250. This enables each of a plurality of HMDs 100 to start the application and share the file data.

Note that the file data may be played not only by the same applications but also by different applications. Accordingly, different applications may be associated with the application list 250 in each of the HMDs 100. This enables the HMDs 100 equipped with different applications to play the file data in linkage among them.

Furthermore, in the case where the file data is an AR object, aligning the coordinate system in each of the HMDs 100 with respect to the linkage mark 820 allows each of the HMDs 100 to share the coordinates of the AR object.

<Thirteenth Modification>

In addition, the specific icon 822 displayed on the display 531 of the smartphone 500 may be displayed, while being used as the linkage mark 820, in a manner showing that it is being used (linkage display). Being used as the linkage mark 820 means that the linkage application associated with the icon 822 is executed in linkage by each of a plurality of HMDs 100.

The linkage display is, for example, displaying the icon 822 with different color or causing the icon to blink, providing the icon 822 with a small mark such as a dot 825 as illustrated in FIG. 14(*b*), or displaying the number of the HMDs in linkage. This allows a user to understand, even in the case where icons of a plurality of applications are displayed, which application is being executed in linkage based on the display modes of icons.

As described above, displaying icons by linkage display enables easy determination as to which application is being executed in linkage while the linkage application is executed in linkage. This makes it easier for a user who joins later to distinguish an icon to be recognized.

<Fourteenth Modification>

In each of the embodiments and modifications described above, when there is a change in members of the linkage group such as new registration of a member in the linkage group list or deletion of a member from the linkage group list, each of the HMDs 100 may notify its user 900 of the change above, for example, by displaying the notification on the display 131, outputting sound from the speaker 141, causing the vibration generation device 173 to vibrate, or the like. This enhances the convenience of the user 900.

<Fifteenth Modification>

In the case where another HMD 100 joins the linkage group after linkage execution of the linkage applications has been started, this HMD 100 may be provided with permission from all the HMDs 100 which have already participated in the linkage group or the representative HMD 100 and then join the linkage group.

For example, when the HMD 100 whose user wants to join the linkage group transmits the detection notification data 280*a*, each of the HMDs 100 or the representative HMD 100 confirms whether to permit the participation of the transmission source HMD 100, for example, by authentication processing or the like. The transmission source HMD 100 can be added in the linkage group only when permitted, and then would receive the participation permission notification.

<Sixteenth Modification>

The information terminals that execute the linkage applications in linkage with each other are not limited to the HMDs 100. For example, they may be the smartphones 500, personal computers, tablets, or the like. These information terminals may be mixed. The information processing terminals may be the ones at least including configurations capable of determining detection of the linkage marks 810, 820 and configurations capable of executing the linkage applications.

<Seventeenth Modification>

The linkage mark 820 may not be a mark in the real space. For example, it may be a mark in a VR (Virtual Reality) space. For example, in the VR space, when avatars which are represent the users 900 recognize the same linkage mark, they execute the linkage applications associated with the recognized linkage mark in linkage by them. For example, in order to recognize the linkage mark in the VR space, the avatars are caused to touch (instruction to select) the linkage mark in the VR space. Thus, even in the case where there are many users (avatars) in the VR space, applications can be executed in linkage with only the avatars of users who have provided instructions to select the linkage mark.

Application Example

In the third embodiment, the device that displays the linkage mark 820 is not limited to the display 531 of the smartphone 500. For example, it may be a screen for projecting video.

For example, the users 900 gathered in a meeting room wear the HMDs 100, and look at a linkage mark displayed on a screen (display) in the meeting room through the visual fields thereof, respectively, whereby the HMDs 100 detect the linkage mark. The linkage mark is associated with the linkage application in each of the HMDs 100. Each of the HMDs 100 identifies and starts the corresponding linkage application. Then, the start notification data is transmitted and received among them, and the linkage group is managed.

Thus, the linkage group of the meeting is automatically formed with the HMDs 100 of the users 900 who are in the meeting room so that the linkage applications can be executed in linkage with each other.

For example, using a linkage application having various processing functions for meetings, such as sharing materials only within a linkage group of a meeting, recording statements of participants, and creating meeting minutes enables smooth management of meetings and thus can increase the efficiency.

Furthermore, keeping displaying the linkage mark on one end of the screen during the meeting allows the HMD 100 whose user wants to join the meeting in the middle to start the linkage application and join the meeting merely by detecting the linkage mark. In particular, in the case of meetings, it is often the case that members vary in each case. Even in such a situation, according to the present example, simply displaying an icon of a linkage application on a screen enables automatic formation of a linkage group and thus smooth management of the meeting. This can further improve the convenience.

Still further, the second embodiment can be applied to remote meetings. For example, in the case where there is a plurality of meeting locations, the same linkage marks 810 are provided in advance at the meeting locations, respectively. In order to participate in the remote meeting, the HMDs 100 are merely required to detect the linkage marking 810, whereby the linkage applications can be automatically started. This enables formation of a linkage group of the HMDs 100 at the remote locations.

The HMDs 100 registered in the linkage group can execute linkage applications in linkage with each other by communication using a network such as LAN via the server 400. Using a linkage application as an application for realizing various functions for meetings enables remote meetings to be easily performed.

In this case, the linkage application may be started at the same time by a trigger such as an icon touch in each of the meeting locations or in each of the icon installation locations, or may be started at the timing of each of the HMDs 100. After linkage groups are formed in the meeting locations, the server 400 may integrate these linkage groups of all the meeting locations. In this case, connection to the server 400 may be performed via the representative HMDs 100 of the linkage groups in the meeting locations, respectively.

The present invention is not limited to the embodiments and modifications described above, but includes other various modifications. For example, the embodiments described above have been explained in detail in order to clarify the present invention, but are not necessarily limited to those having all the features as described. In addition, a part of the configuration of the present embodiments and modifications can be replaced with that of other embodiments and modifications, and the features of other embodiments and modifications can be added to the configuration of the present embodiments and modifications. Furthermore, it is possible to add, delete, or replace other configurations with respect to a part of the configuration of the present embodiments and modifications.

Some or all the configurations, functions, processing units, and processing means described above may be implemented by hardware, for example, by designing them with an integrated circuitry. In addition, the configurations and functions described above may be implemented by software by interpreting and executing programs in which the processor implements the respective functions. Information such as programs, tables, and files for implementing various functions can be placed in recording devices such as a memory, hard disk, and solid-state drive (SSD), or recording media such as an IC card, SD card, and DVD.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

100: HMD, 101: HMD, 102: HMD, 103: HMD, 104: HMD, 110: memory and storage, 111: main processor, 112: system bus, 113: RAM, 114: ROM, 115: flash memory, 120: operation acceptance device, 121: operation key, 130: image processing device, 131: display, 131a: linkage visual field, 133: out-camera, 134: in-camera, 136: captured image, 137: area, 140: audio processing device, 141: speaker, 143: microphone, 150: sensor, 151: GPS receiver, 152: gyro sensor, 153: geomagnetic sensor, 154: acceleration sensor, 155: depth sensor, 160: communication device, 161: LAN communication I/F, 162: telephone network communication I/F, 163: near field communication I/F, 171: extended interface section, 172: timer, 173: vibration generation device, 210: main controller, 220: detector, 230: execution section, 240: linkage section, 250: application list, 251: application ID, 252: mark data, 253: shape data, 254: mark ID, 260: linkage group list, 261: mark ID storage location, 262: device ID, 263: address, 270: processing data, 280: notification data, 280a: detection notification data, 280b: termination notification data, 281: mark ID, 282: device ID, 283: address, 284: application ID, 285: status, 300: network, 400: server, 401: CPU, 402: memory, 403: storage, 404: communication interface, 410: main controller, 420: transmission and reception section, 430: linkage controller, 440: linkage management section, 460: linkage group list, 461: mark ID storage location, 462: device ID, 463: address, 500: smartphone, 510: memory and storage, 511: main processor, 512: internal bus, 513: RAM, 514: ROM, 515: flash memory, 520: operation acceptance device, 521: operation key, 523: touch panel, 530: image processing device, 531: display, 533: out-camera, 534: in-camera, 540: audio processing device, 541: speaker, 543: microphone, 550: sensor, 551: GPS receiver, 552: gyro sensor, 553: geomagnetic sensor, 554: acceleration sensor, 555: depth sensor, 560: communication device, 561: LAN communication interface, 562: telephone network communication interface, 563: near field communication interface, 570: main controller, 571: acceptance section, 572: transmission and reception section, 573: linkage management section, 574: application execution section, 575: output section, 576: application program storage, 577: icon data storage, 578: linkage group list, 591: extended interface section, 592: timer, 593: vibration generation device
700: information processing system, 701: information processing system, 702: information processing system
810: linkage mark, 820: linkage mark, 822: icon, 823: icon, 824: icon, 825: dot
900: user, 901: user, 902: user, 903: user, 904: user, 912: wireless communication, 913: wireless communication, 914: wireless communication, 923: wireless communication, 924: wireless communication, 934: wireless communication, 941: line of sight, 942: line of sight, 943: line of sight, 944: line of sight

The invention claimed is:

1. An information processing system comprising:
a first information processing terminal including a communication interface, a camera configured to capture an image around the first information processing terminal, and processing circuitry; and
a server configured to manage a plurality of information processing terminals, including the first information processing terminal, as member terminals of a linkage group,
wherein the processing circuitry of the first information processing terminal is configured to, in response to detection of a linkage mark from a captured image acquired by the camera, transmit, to the server by the communication interface, detection notification data including mark identification information identifying the linkage mark and first terminal identification information identifying the first information processing terminal,
wherein the server is configured to, upon receiving the detection notification data, manage the first information processing terminal as one of member terminals of the linkage group for executing linkage application software associated with the mark identification information included in the detection notification data, and transmit start instruction data instructing a start of the linkage application software to the first information processing terminal,
wherein the processing circuitry of the first information processing terminal is further configured to:
in response to reception of the start instruction data, start the linkage application software associated with the linkage mark; and
in response to termination of the linkage application software, transmit, to the server by the communication interface, termination notification data notifying the termination of the linkage application software and including the mark identification information and the first terminal identification information, and
wherein the server is further configured to, upon receiving the termination notification data from the first information processing terminal, exclude the first information processing terminal corresponding to the first terminal identification information included in the termination notification data from the linkage group based on the linkage mark identified by the mark identification information included in the termination notification data.

2. The information processing system according to claim 1, wherein
the linkage mark is displayed on a display of a second information processing terminal of the plurality of information processing terminals, and
the processing circuitry of the first information processing terminal detects the linkage mark when having detected that the second information processing terminal is in a predetermined placement state.

3. The information processing system according to claim 1, wherein the processing circuitry of the first information processing terminal detects a predetermined mark as the linkage mark when detecting that the predetermined mark is in a predetermined placement state.

4. The information processing system according to claim 1, wherein the processing circuitry of the first information processing terminal transmits data obtained by a processing of the linkage application software to other information processing terminals which are the member terminals of the linkage group and receives data about the processing of the linkage application software obtained by the other information processing terminals to execute the linkage application software in linkage with the other information processing terminals.

5. The information processing system according to claim 1, wherein the linkage mark is an icon for calling a function to start the linkage application software.

6. The information processing system according to claim 1, wherein the first information processing terminal is a head mounted display.

7. An information processing system comprising:
a first information processing terminal including a communication interface, a camera configured to capture an image around the first information processing terminal, and processing circuitry; and
a second information processing terminal configured to manage a plurality of information processing terminals as member terminals of a linkage group,
wherein the processing circuit of the first information processing terminal is configured to, in response to detection of a linkage mark from a captured image acquired by the camera, transmit, to the second information processing terminal by the communication interface, detection notification data including mark identification information identifying the linkage mark and first terminal identification information identifying the first information processing terminal,
wherein the second information processing terminal is configured to, upon receiving the detection notification data, manage the first information processing terminal as one of member terminals of the linkage group for executing linkage application software associated with the mark identification information included in the detection notification data, and transmit start instruction data instructing a start of the linkage application software to the first information processing terminal,
wherein the processing circuitry of the first information processing terminal is further configured to:
in response to reception of the start instruction data, start the linkage application software associated with the linkage mark, and
in response to termination of the linkage application software, transmit, to the second information processing terminal by the communication interface, termination notification data notifying the termination of the linkage application software and including the mark identification information and the first terminal identification information, and
wherein the second information processing terminal is further configured to, upon receiving the termination notification data from the first information processing terminal, excludes the first information processing terminal corresponding to the first terminal identification information included in the termination notification data from the linkage group based on the linkage mark identified by the mark identification information included in the termination notification data.

8. The information processing system according to claim 7, wherein the processing circuitry of the first information processing terminal detects a predetermined mark as the linkage mark when detecting that the predetermined mark is in a predetermined placement state.

9. The information processing system according to claim 7, wherein
the linkage mark is displayed on a display of the second information processing terminal, and
the processing circuitry of the first information processing terminal detects the linkage mark when having detected that the second information processing terminal is in a predetermined placement state.

10. The information processing system according to claim 7, wherein the processing circuitry of the first information processing terminal transmits data obtained by processing of the linkage application software to other information processing terminals which are the member terminals of the linkage group and receives data about the processing of the linkage application software obtained by the other information processing terminals to execute the linkage application software in linkage with the other information processing terminals.

11. The information processing system according to claim 7, wherein the linkage mark is an icon for calling a function to start the linkage application software.

12. The information processing system according to claim 7, wherein the first information processing terminal is a head mounted display.

13. The information processing system according to claim 7, wherein the second information processing terminal is a smartphone.

14. The information processing system according to claim 13, wherein the processing circuitry of the first information processing terminal detects a predetermined mark as the linkage mark when detecting that the predetermined mark is in a predetermined placement state.

15. The information processing system according to claim 13, wherein
the linkage mark is displayed on a display of the smartphone, and
the processing circuitry of the first information processing terminal detects the linkage mark when having detected that the smartphone is in a predetermined placement state.

16. The information processing system according to claim 13, wherein the processing circuitry of the first information processing terminal transmits data obtained by a processing of the linkage application software to other information processing terminals which are the member terminals of the linkage group and receives data about the processing of the linkage application software obtained by the other information processing terminals to execute the linkage application software in linkage with the other information processing terminals.

17. The information processing system according to claim 13, wherein the linkage mark is an icon for calling a function to start the linkage application software.

18. The information processing system according to claim 13, wherein the first information processing terminal is a head mounted display.

* * * * *